(12) United States Patent
Broersma et al.

(10) Patent No.: US 10,731,863 B2
(45) Date of Patent: Aug. 4, 2020

(54) APPARATUS FOR COMBUSTION OF SOLID FUELS

(71) Applicant: Prakti Pte. Ltd., Singapore (SG)

(72) Inventors: Jiddu Alexander Broersma, Amsterdam (NL); Mouhsine Serrar, Oakland, CA (US)

(73) Assignee: Prakti Pte. Ltd., Singapore (SG)

( * ) Notice: Subject to any disclaimer, the term of this patent is extended or adjusted under 35 U.S.C. 154(b) by 235 days.

(21) Appl. No.: 15/682,403

(22) Filed: Aug. 21, 2017

(65) Prior Publication Data

US 2018/0094818 A1 Apr. 5, 2018

Related U.S. Application Data

(60) Provisional application No. 62/404,674, filed on Oct. 5, 2016.

(51) Int. Cl.
| | |
|---|---|
| F24B 1/02 | (2006.01) |
| A47J 37/06 | (2006.01) |
| F24B 1/189 | (2006.01) |
| F24B 5/02 | (2006.01) |
| F24B 13/02 | (2006.01) |
| F24B 13/04 | (2006.01) |

(52) U.S. Cl.
CPC ......... F24B 1/028 (2013.01); A47J 37/0688 (2013.01); F24B 1/189 (2013.01); F24B 5/025 (2013.01); F24B 5/028 (2013.01); F24B 5/021 (2013.01); F24B 13/02 (2013.01); F24B 13/04 (2013.01)

(58) Field of Classification Search
CPC .............................. F24B 5/028; F24B 1/1895
USPC ..................... 126/77; 431/9; 110/213, 214
See application file for complete search history.

(56) References Cited

U.S. PATENT DOCUMENTS

| 3,043,249 | A | * | 7/1962 | Hebert ...................... F23G 5/12 |
| | | | | 110/211 |
| 3,279,453 | A | | 10/1966 | Norehad et al. |
| 4,375,215 | A | | 3/1983 | Koppe |
| 4,471,751 | A | * | 9/1984 | Hottenroth ................ F24C 1/16 |
| | | | | 126/15 R |
| 4,503,835 | A | | 3/1985 | Williams |
| 4,579,525 | A | | 4/1986 | Ross |
| 5,002,037 | A | * | 3/1991 | Armstrong .............. F24B 1/205 |
| | | | | 126/29 |
| 5,293,859 | A | | 3/1994 | Lisker |

(Continued)

OTHER PUBLICATIONS

Bairiganjan et al. (2010). "Power to the people—Investing in clean energy for the base of the pyramid in India," Center for Development Finance of Institute for Finance and Management Research and World Resources Institute Report, 74 pages.

(Continued)

*Primary Examiner* — Grant Moubry
*Assistant Examiner* — Aaron H Heyamoto
(74) *Attorney, Agent, or Firm* — Morrison & Foerster LLP

(57) ABSTRACT

An apparatus and method for the combustion of solid fuel are provided. The apparatus includes a combustion chamber with a floor, a side opening, an airflow disk located above the side opening, and secondary air inlets located above the airflow disk. The apparatus and method can efficiently combust solid fuels with low emission of particulate matter and harmful gases, continuous feeding of fuel during combustion, and the production of a spiral flame.

19 Claims, 17 Drawing Sheets

(56) References Cited

U.S. PATENT DOCUMENTS

| | | | |
|---|---|---|---|
| 6,158,425 A | 12/2000 | Kim | |
| 6,314,955 B1 | 11/2001 | Boetcker | |
| 6,595,199 B1 | 7/2003 | Andersen et al. | |
| 6,615,821 B1* | 9/2003 | Fisenko | A47J 37/0704 |
| | | | 126/15 R |
| 7,204,864 B2 | 4/2007 | Stephens | |
| D612,662 S | 3/2010 | Lorenz et al. | |
| D640,497 S | 6/2011 | Lorenz et al. | |
| 9,435,544 B2 | 9/2016 | Serrar | |
| 2006/0096162 A1 | 5/2006 | Contreras | |
| 2010/0104993 A1* | 4/2010 | Ryser | F23D 3/16 |
| | | | 431/252 |
| 2015/0083108 A1* | 3/2015 | DeFoort | F24B 1/003 |
| | | | 126/25 R |

OTHER PUBLICATIONS

Bruce et al. (2002). "The health effects of indoor air pollution exposure in developing countries," WHO report, 41 pages.

Bryden et al. (2002) "Design principles for wood burning cook stoves," Aprovecho Research Center, 40 pages.

Bryden et al. (2005) "Comparing cooking stoves [Draft]," Aprovecho Research Center, 94 pages.

Duflo et al. (2008). "Cooking stoves, indoor air pollution and respiratory health in India," joint study by J-PAL of MIT and CMR of IFMR, 10 pages.

E. Duflo et al. (2010). "Indoor air pollution, health, and economic well-being," MIT, 22 pages.

Global Alliance for Clean Cookstoves, (Nov. 2011) "Igniting change: A strategy for universal adoption of clean cookstoves and fuels," 56 pages.

Klingshim (2005). "Solar cookers for UNHCR refugee projects?" GTZ, 47 pages.

Mart Rural Solutions (2006). "Report on market testing of 5 stoves prototypes in Kamataka and Tamil Nadu," 57 pages.

Olsen and Mehta (2006). "Female labour participation in rural and urban India: Does housewives' work count?" Radical Statistics (93), 39 pages.

Shrimali et al. (2010). "Improved stoves in India: a study of business models," Energy Policy, article in press, 14 pages.

Simanis and Hart (2008). "Base of the pyramid protocol 2.0," 57 pages.

Smith, Kirk (2000). "National burden in India from indoor air pollution," PNAS 97(24):13286-13293.

Venkataraman et al. (2010). "The Indian national initiative for advanced biomass cookstoves: The benefits of clean combustion," Energy for Sustainable Development 14:63-72.

Warwick and Doig (2004). "Smoke—the killer in the kitchen: Indoor air pollution in developing countries," Practical Action, ITGD, 47 pages.

Westhoff and Germann (1995). "Stove images—A documentation of improved and traditional stoves in Africa, Asia and Latin America," GTZ, 65 pages.

World Health Organization (2006). "Indoor air pollution, health, and the burden of disease," WHO briefing, 4 pages.

World Health Organization (2009). "The energy access situation in developing countries," WHO & UNDP Sustainable Energy Program paper, 142 pages.

Non-Final Rejection, U.S. Pat. No. 9,435,544, dated Feb. 1, 2016, 7 pages.

* cited by examiner

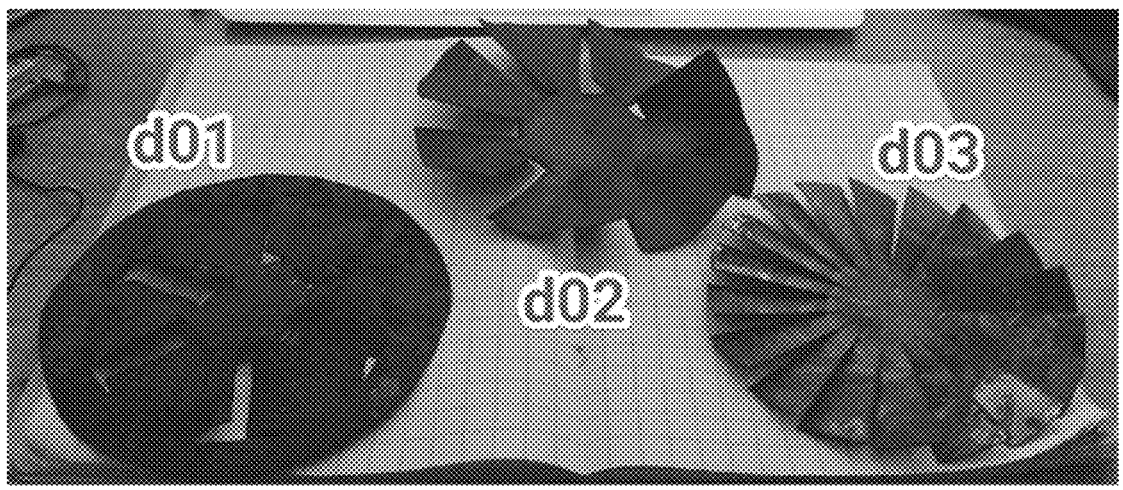
*FIG. 3C*
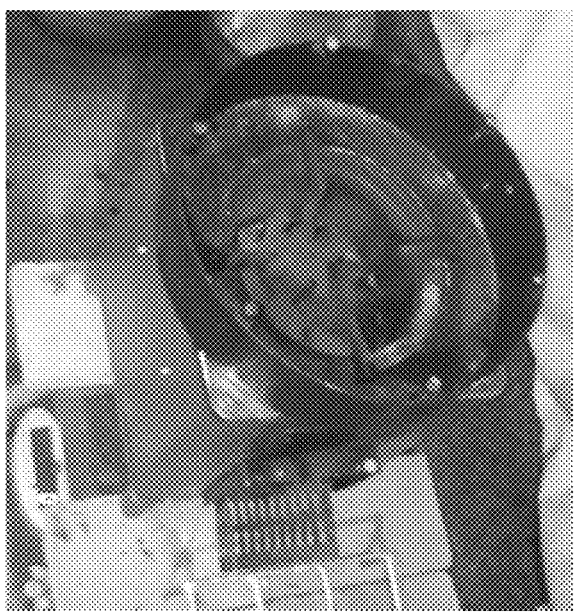 
*FIG. 4A*　　　　*FIG. 4B*

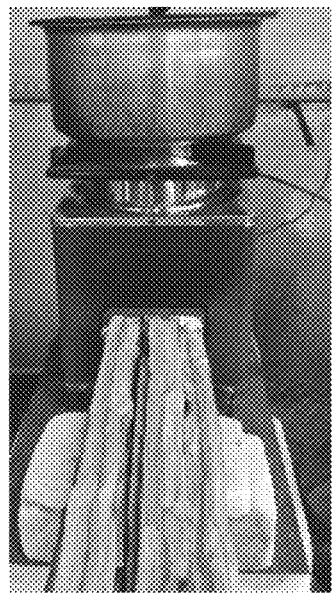 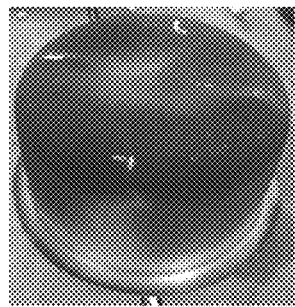
*FIG. 20A*  *FIG. 20B*
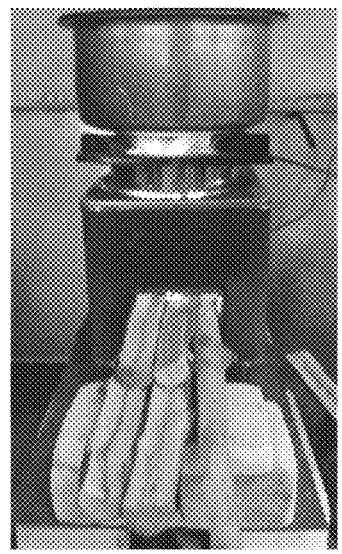 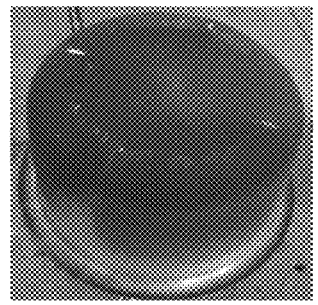
*FIG. 21A*  *FIG. 21B*

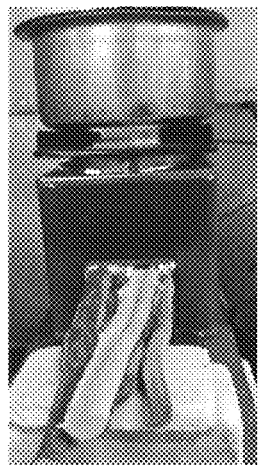 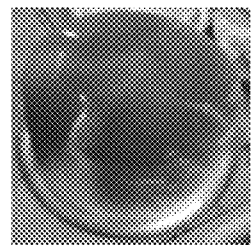 
*FIG. 22A*  *FIG. 22B*  *FIG. 23*
  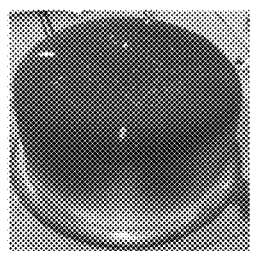
*FIG. 24*  *FIG. 25A*  *FIG. 25B*
 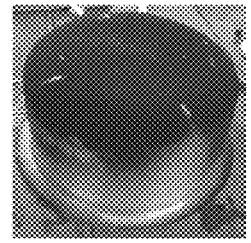
*FIG. 26A*  *FIG. 26B*

APPARATUS FOR COMBUSTION OF SOLID FUELS

CROSS-REFERENCE TO RELATED APPLICATIONS

This application claims priority to and the benefit of U.S. Provisional Patent Application No. 62/404,674, filed Oct. 5, 2016, which is incorporated herein by reference in its entirety.

FIELD

The present disclosure relates generally to a combustion apparatus, and more specifically to cooking stoves that utilize an airflow disk for the combustion of solid fuels.

BACKGROUND

A large portion of the world's population relies on solid fuels for cooking, such as collected woody sticks. These fuels are frequently burned using indoor cookstoves, which release smoke and other harmful compounds (e.g., carbon monoxide). This can be a significant health and safety hazard, causing illness and premature death in populations that have few cooking or heating alternatives. Thus, there is a need for cookstoves which can burn solid fuels such as biomass with lower emission of particulate matter and harmful gases.

One method of reducing indoor air pollution is the use of top-lit updraft (TLUD) stoves, in which fuel is burned to produce combustible gases, those gases are mixed with air entering the stove, and the mixture undergoes combustion with low smoke emission. However, TLUD stoves have limitations in day-to-day use by individuals. In a TLUD stove, the user places a set amount of fuel into the bottom of the stove, the fuel is lit, and a cooking apparatus is placed on top of the stove for use. The user cannot tend to the fuel during use, but rather is restricted to the amount of fuel that was placed in the TLUD prior to lighting. In addition, the user must often process the fuel, such as chopping or cutting into smaller pieces, in order to fit fuel into the stove. Tending the fuel during use could allow the user to control, for example, the duration of cooking time, preventing the waste of burning fuel past the need for the stove. A cookstove able to accommodate large pieces of fuel with minimal or no processing, such as gathered logs or branches, would save time and effort by the user. Thus, what is needed in the art are cookstoves which can burn fuel efficiently and with low emission of particulate matter and harmful gases, in which the cookstove can accommodate fuel with minimal processing and that can be tended by the user during use.

BRIEF SUMMARY

The present disclosure addresses this need by providing a method and an apparatus for burning solid fuel that reduces the amount of smoke and harmful gas emissions, and in which the fuel can be fed continuously.

In one aspect, provided herein is a combustion apparatus including a combustion chamber, a fuel support, and an airflow disk. The combustion chamber may include an inner wall defining a combustion space, and forming a floor, a side opening, and an outlet. In some variations, the outlet is positioned opposite the floor, and the side opening is located between the floor and the outlet. The inner wall may include a plurality of secondary air holes located between the outlet and the side opening. The fuel support may include a grate, and the fuel support is located between the top and bottom of the side opening wherein at least a portion of the fuel support is located within the combustion chamber above the floor. The airflow disk is located between the side opening and the secondary air holes, includes a plurality of blades joined at the center of the airflow disk, and is configured to allow combustion gases to flow through the disk.

In some embodiments, the combustion apparatus further includes a housing unit, wherein the housing unit includes a top surface, a bottom surface, and an outer wall, and the top surface of the housing unit includes a first opening, wherein the first opening is contiguous with the outlet, or wherein the combustion chamber extends through the first opening; and the outer wall includes a second opening contiguous with the side opening of the combustion chamber.

In some embodiments, the fuel support includes a solid surface, and at least a portion of this solid surface is located within the combustion chamber adjacent to the side opening. In other embodiments, the combustion apparatus includes a cooking utensil support, wherein the cooking utensil support is located above the first opening and contacts the top surface of the housing unit, the top of the combustion chamber, or both. In some embodiments, the fuel is biomass, such as lignocellulosic biomass. In other embodiments, the side opening is configured to receive fuel, or is configured to receive fuel continuously. In some embodiments, the fuel is minimally or not processed prior to combustion.

Provided herein is also a method of combusting fuel that includes:
  combining combustible gases with primary air to form a first mixture in a combustion chamber, wherein the combustible gases are produced from fuel within the combustion chamber, and wherein the primary air enters the combustion chamber above and below the fuel;
  passing the first mixture vertically through an airflow disk, wherein the airflow disk directs the first mixture along a spiral path above the airflow disk; and
  combining at least a portion of the first mixture with secondary air to form a second mixture, wherein the secondary air enters the combustion chamber above the airflow disk.

In some embodiments, the secondary mixture produces heat. In certain embodiments, the method includes feeding the fuel into the combustion chamber. In certain embodiments, the fuel is continuously fed into the combustion chamber during combustion. In still other embodiments, the method includes igniting the fuel to produce the combustible gases. In other embodiments, the method includes producing flame from at least a portion of the first mixture. In certain embodiments, the flame is passed through the airflow disk, and the airflow disk directs the flame along a spiral path above the airflow disk.

DESCRIPTION OF THE FIGURES

The present application can be best understood by reference to the following description taken in conjunction with the accompanying drawing figures, in which like parts may be referred to by like numerals.

FIG. 3C is an image of three different airflow disks evaluated in cookstoves.

FIG. 4A is a top-view of a cookstove with a closed-bottom combustion chamber, in which a pot skirt has been placed over the outlet.

FIG. 4B is a side-view of a cookstove with a closed-bottom combustion chamber, in which a pot skirt has been placed over the outlet.

FIG. 20A depicts the use of Cookstove 1.32 with pot 1 during the accumulation of data shown in FIG. 11.

FIG. 20B depicts the bottom of pot 1 following use with Cookstove 1.32.

FIG. 21A depicts the use of Cookstove 1.32 with pot 1 during the accumulation of data shown in FIG. 11.

FIG. 21B depicts the bottom of pot 1 following use with Cookstove 1.32

FIG. 22A depicts the use of Cookstove 1.31 with pot 3 during the accumulation of data shown in FIG. 11.

FIG. 22B depicts the bottom of pot 3 following use with Cookstove 1.31.

FIG. 23 depicts the use of Cookstove 1.31 with pot 4 during the accumulation of data shown in FIG. 11.

FIG. 24 depicts the location of the airflow disk in the cookstove following the accumulation of data shown in FIG. 11.

FIG. 25A depicts the use of an MFS P4 with pot 5 during the accumulation of data shown in FIG. 11.

FIG. 25B depicts the bottom of pot 5 following use with an MFS P4.

FIG. 26A depicts the use of an MFS P4 with pot 6 during the accumulation of data shown in FIG. 11.

FIG. 26B depicts the bottom of pot 6 following use with an MFS P4.

DETAILED DESCRIPTION

The following description sets forth exemplary methods, parameters and the like. It should be recognized, however, that such description is not intended as a limitation on the scope of the present disclosure but is instead provided as a description of exemplary embodiments.

The following description relates to an apparatus and method for burning solid fuel, such as biomass. By using the apparatus and method described herein, a user can add or remove fuel during combustion, controlling the time period of combustion and amount of fuel used while fuel is combusted efficiently and with low emission of unwanted materials, such as particulate matter. The combustion apparatus described herein comprises a side opening, a plurality of secondary air holes, and an airflow disk, which together allow air to flow through the apparatus and mix with combustible gases from the fuel to efficiently burn with low emissions, while also allowing a user to tend the fuel during use.

In some variations, the combustion apparatus as described herein is a natural draft apparatus. A natural draft is one generated by the rising of warm air or other gasses, drawing cooler air and/or gasses from below. This is in contrast to a forced draft, wherein the flow of air or other gasses is provided or supplemented by a mechanical device, such as an electrical fan.

Figure 1:
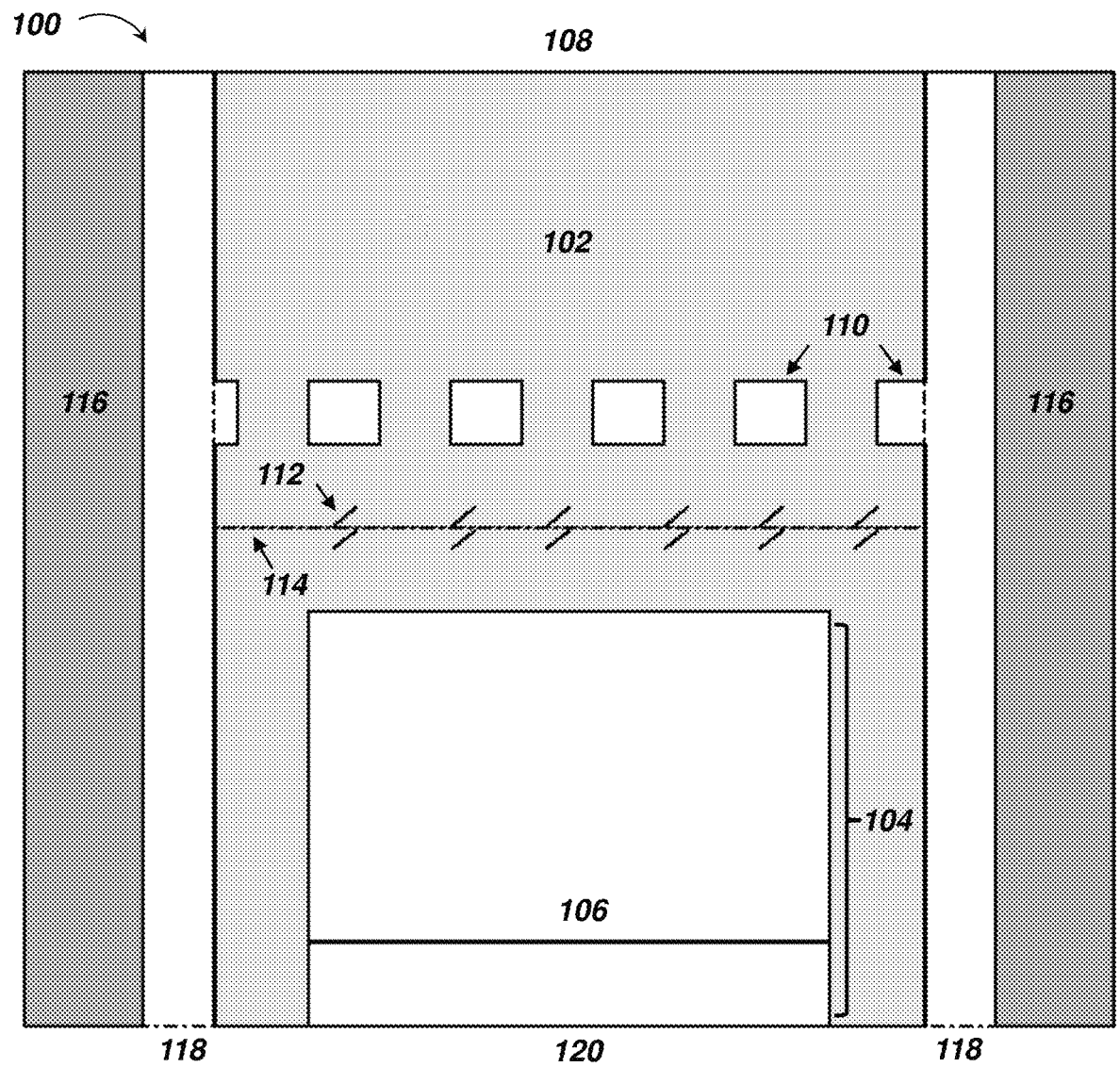
FIG. 1 depicts a diagram of a vertical cross-section view of an exemplary combustion apparatus.

With reference to FIG. 1, a vertical cross-sectional view of exemplary combustion apparatus 100 is depicted. Apparatus 100 comprises combustion chamber 102, side opening 104, fuel support 106, a plurality of secondary air holes 110, and airflow disk 114. Combustion chamber 102 comprises an inner wall defining a combustion space, and forming a floor 120, outlet 108, and side opening 104. Outlet 108 is configured to allow combustion products to exit the combustion chamber. Side opening 104 is configured to allow fuel to enter the combustion chamber. Apparatus 100 also comprises fuel support 106, at least a portion of which is located within the combustion space and above floor 120. Combustion chamber 102 further comprises a plurality of secondary air holes 110, which are located between outlet 108 and side opening 104. These secondary air holes are configured to allow air to flow into the combustion chamber. Airflow disk 114 is located between side opening 104 and the plurality of air holes 110. The airflow disk 114 comprises a plurality of blades 112 joined at the center of the disk, and is configured to allow combustion gases to flow through the disk. Combustion gases may include, for example, gasses released from the fuel, primary air, or a combination thereof.

It should be understood that in other variations, apparatus 100 may comprise one or more additional components, such as a housing unit, secondary air inlets, an airflow disk support ring, a door at least partially covering the side opening, a cooking utensil support, or any combinations thereof, as described in further detail below.

The relative location of the side opening, the fuel support, the airflow disk, and the plurality of secondary air holes leads to the production of combustible gases from fuel and mixing of those gases with secondary air in efficient combustion, while also allowing a user to continuously monitor, feed, and/or remove fuel. In one embodiment, primary air flows into the combustion chamber through the side opening and past ignited fuel on the fuel support. The ignited fuel produces gases. These gases flow up through the combustion space and up through the airflow disk. In some embodiments, primary air also flows up through the combustion space and through the airflow disk. Secondary air enters the combustion chamber through the secondary air holes and mixes with the combustible gases (which may include gases from the fuel, primary air, or a mixture thereof) above the airflow disk. In certain variations, heat, flame, or a combination thereof are produced from combustion of these gases.

Airflow Disk

The airflow disk separates the combustion space into two combustion zones, a lower combustion zone below the disk and an upper combustion zone above the disk. In the lower combustion zone, primary air passes the ignited fuel to produce combustible gases, which then pass through the airflow disk to mix with secondary air in the upper combustion zone.

The airflow disk is located within the combustion chamber above the side opening, such that the side opening does not directly feed primary air into the upper combustion zone. In some embodiments, the airflow disk is located closer to the side opening than it is to the outlet at the top of the combustion chamber. Placement closer to the side opening increases the length of the upper combustion zone, which may lead to more complete combustion with lower emission of undesired compounds, such as particulate matter. Without wishing to be bound by any theory, increasing the length of the upper combustion zone may also increase the draft acting on the secondary air holes and spaces in the airflow disk. Greater force may allow for increased control of mixing of combustion gases and secondary air, and may also allow more time for the combustion gases and secondary air to mix.

Furthermore, without wishing to be bound by any theory, locating the airflow disk close to the side opening may decrease the opportunity for the combustion gases to cool before passing through the airflow disk. Combustion gases that have cooled may not have enough heat to continue combustion, but rather proceed through the combustion chamber as smoke.

In some embodiments, the airflow disk is located within the first 30% of the distance from the side opening to the outlet, within the first 20% of the distance from the side opening to the outlet, within the first 10% of the distance from the side opening to the outlet, within the first 5% of the distance from the side opening to the outlet, within the first 0% to 50% of the distance from the side opening to the outlet, within the first 0% to 20% of the distance from the side opening to the outlet, or within the first 0% to 10% of the distance from the side opening to the outlet.

Figure 3A:
FIG. 3A is an image of an airflow disk in which the blades are connected at the circumference of the disk.
Figure 3B:
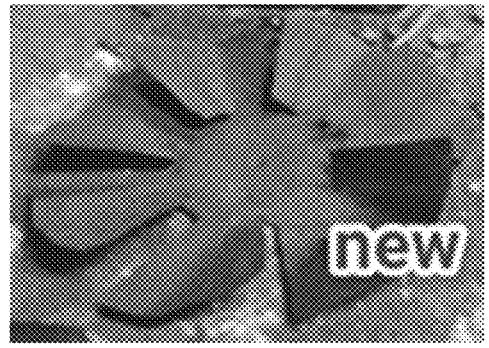
FIG. 3B is an image of an airflow disk in which the blades are not connected at the circumference of the disk.

The airflow disk comprises a plurality of blades joined at the center of the disk, as depicted, for example, in FIGS. 3A, 3B, and 3C. In some variations, at least a portion of the blades do not contact each other at the circumference of the disk, as seen, for example in FIG. 3B. In other embodiments, at least a portion of the blades are connected at the circumference of the disk, as seen, for example, in FIG. 3A. The presence of the airflow disk reduces the cross-sectional area through which gases may flow up through the combustion chamber. This reduces the amount of excess air present in the upper combustion chamber. In some embodiments, the amount of excess air is decreased to less than 500% excess air, less than 400% excess air, less than 300% excess air, between about 100% to about 500% excess air, or between about 100% to about 300% excess air. In one embodiment, the presence of the airflow disk reduces the amount of excess air to from about 100% to about 300%. For example, in some embodiments, the excess air in the absence of the airflow disk is 800%, and in the presence of the airflow disk the excess air is from about 100% to about 300%.

In some embodiments, excess air is the amount of oxygen provided which is not combusted. For example, in one simplified model of excess air, if two molecules of oxygen are provided to the combustion chamber, and only one molecule of oxygen is consumed by combustion, then 100% excess air was provided to the combustion chamber.

In certain embodiments, reducing air flow by the presence of the airflow disk affects combustion parameters such that the excess air during combustion is reduced from above 800% without the disk to below 300% with the disk. In some embodiments, the cross-sectional air flow through the airflow disk is between 10% to 20% of the cross-sectional area of the air flow through the combustion chamber below the airflow disk. In certain embodiments, limiting the cross-section through which air can flow to 10% to 20% of the combustion chamber cross-section limits the amount of excess air to 100% to 300%. Excess air is air supplied to the combustion chamber greater than that which is needed for combustion (e.g., delivering more oxygen to the chamber than can be consumed by combustion). The presence of excess air during combustion can cool down the combustion space, which decreases performance. Thus, decreasing the quantity of excess air present during combustion may in some embodiments improve the performance of the combustion apparatus. In certain embodiments, reducing the excess air also reduces the likelihood of oxygen and combustible gases interacting. Thus, in certain embodiments, low excess air levels may cause incomplete combustion, which may increase emissions and decrease efficiency.

In some embodiments, a portion of one or more of the plurality of blades are rotated or bent at an angle relative to the plane of the center of the disk. For example, depicted in FIG. 3B is an airflow disk comprising a plurality of blades joined at the center of the disk, in which a portion of each blade is bent at an angle relative to the plane of the center. The furthest right airflow disk in FIG. 3C (d03) is one example of an airflow disk comprising a plurality of blades joined at the center of the disk, in which each blade is bent or rotated an angle relative to the plane of the center. In some embodiments, at least a portion of one or more blades is rotated between 15 to 30 degrees from the plane of the center of the disk. In some embodiments, at least a portion of each blade is rotated between 15 to 30 degrees from the plane of the center of the disk. In still other embodiments, each blade is rotated between 15 to 30 degrees from the plane of the center of the disk.

In certain embodiments, angling at least a portion of the blades lengthens the flame path of combustion and improves mixing with the secondary air. This is achieved, for example, by increasing the horizontal path length of the rising gases. Thus, in some embodiments, an airflow disk comprising blades that are bent or rotated and angle relative to the plane of the center of the disk direct the rising combustible gases in a horizontal direction, which increases the flame path of combustion and improves mixing with secondary air. In some embodiments, the airflow disk creates a helical or spiral flow of gases in the upper combustion zone. In certain embodiments, the airflow disk creates a helical or spiral flame, as depicted, for example, in FIG. 15. In some embodiments, the flame forms at least partially below the airflow disk and is directed in a spiral path by the airflow disk. The production of a helical or spiral flame may be a visually appealing aspect of the combustion apparatus described herein, which may increase user satisfaction with the apparatus.

Secondary Air Holes

Referring again to FIG. 1, combustion apparatus 100 has a plurality of secondary air holes 110 located above the airflow disk.

In certain embodiments, the amount of primary air that passes the fuel delivers low levels of oxygen to the combustion chamber (e.g., less than 0% excess air, less than 50% excess air, or less than 100% excess air). Reducing or limiting the primary air passing the fuel may result in a slower fuel burn rate, however this may also reduce combustion of the gases produced by the fuel. Providing secondary air in the upper combustion zone may allow increased levels of combustion while still retaining a slow fuel burn rate.

The location of the secondary air holes can affect the amount of draft, which affects the velocity of secondary air entering the upper combustion zone. In certain embodiments, the plurality of secondary air holes is located closer to the airflow disk than to the outlet of the combustion chamber. In some embodiments, locating the secondary air holes closer to the airflow disk results in greater draft acting on the secondary air holes, which may cause a higher velocity of entering secondary air. A higher velocity of secondary air may increase the mixing with combustion gases in the upper combustion zone.

In some embodiments, the secondary air holes are located within the first 30% of the distance from the side opening to the outlet, within the first 20% of the distance from the side opening to the outlet, within the first 10% of the distance from the side opening to the outlet, within the first 5% of the distance from the side opening to the outlet, within the first 0% to 50% of the distance from the side opening to the outlet, within the first 0% to 20% of the distance from the side opening to the outlet, or within the first 0% to 10% of the distance from the side opening to the outlet. In other embodiments, the secondary air holes are located within the first 30% of the distance from the airflow disk to the outlet, within the first 20% of the distance from the side opening to the outlet, within the first 10% of the distance from the airflow disk to the outlet, within the first 5% of the distance from the airflow disk to the outlet, within the first 0% to 50% of the distance from the airflow disk to the outlet, within the first 0% to 20% of the distance from the airflow disk to the outlet, or within the first 0% to 10% of the distance from the airflow disk to the outlet.

The plurality of secondary air holes may comprise any number, size and shape of holes which results in entry of secondary air into the upper combustion zone. In some embodiments, the secondary air holes are all of substantially the same size and shape. In other embodiments, one or more of the secondary air holes has a different size and/or shape than one or more other secondary air holes. In some embodiments, the secondary air holes are at an angle relative to the inner wall of the combustion chamber. For example, in some embodiments, holes are drilled at an angle into the inner wall of the combustion chamber to produce the secondary air holes. In certain embodiments, each secondary air hole is at the same angle relative to the inner wall of the combustion chamber in which it is located. In other variations, each secondary air hole is angled to direct the secondary air in a rotational path similar to that which the airflow disk directs the combustion gases (which may include gases from the fuel, primary air, or a combination thereof). In certain embodiments, angling the secondary air holes and/or directing the secondary air in a rotation similar to the combustion gases improves the spiral pattern induced by the airflow disk.

In some embodiments, the plurality of secondary air holes are circular in shape. In certain embodiments, the plurality of secondary air holes are regularly spaced along the wall of the combustion chamber. In still other embodiments, each of the secondary air holes is located at substantially the same distance above the plane of the airflow disk.

In one embodiment, the secondary air holes are circular holes with a diameter between 5 mm to 10 mm. In one embodiment, the secondary air holes are located between 10 mm to 20 mm above the airflow disk. In another embodiment, the combustion apparatus comprises twelve secondary air holes. In certain embodiments, these secondary air holes are at an angle in the wall of the combustion chamber.

Fuel Support

Referring again to FIG. 1, combustion apparatus 100 has fuel support 106, which is configured to support fuel, such as biomass. At least a portion of the fuel support is located within the combustion space, above the floor of the combustion space. In certain embodiments, at least a portion of fuel support 106 extends out of the combustion space through the side opening, for example to support larger pieces of fuel being fed into the apparatus.

The location of the fuel support above the floor of the combustion chamber allows primary air to enter the combustion space from below the fuel. In some embodiments, the fuel support is located at least 25 mm, at least 40 mm, or between 25 mm to 40 mm from the floor of the combustion chamber. In certain embodiments, the fuel support is located closer to the floor of the combustion chamber than to the top of the side opening.

Figure 2A:
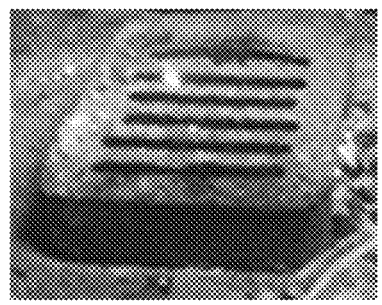
FIG. 2A is an image of a fuel support including a grate.
Figure 2B:
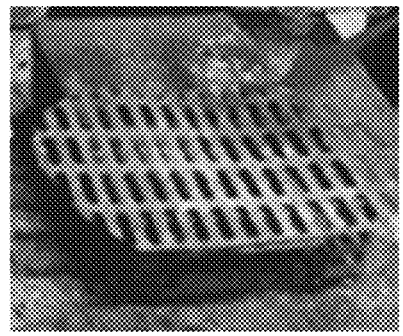
FIG. 2B is an image of a fuel support including a grate and a solid surface.
Figure 2C:
FIG. 2C is an image of wood fuel being fed into the side opening of a cookstove in which unburned char has accumulated within the combustion chamber. The fuel support shown in FIG. 2A is used with this cookstove.

In some embodiments, as fuel burns in the apparatus, unburned char accumulates on the fuel support. For example, depicted in FIG. 2C is a combustion apparatus in which wooden biomass is used as fuel, wherein unburned char has accumulated within the combustion chamber. By locating the fuel support above the floor of the combustion chamber, primary air can enter the combustion chamber from underneath the fuel support and contact this unburned char, aiding in combustion of the char. In some embodiments, this additional combustion increases the combustion efficiency of the apparatus.

In some embodiments, the fuel support comprises a grate. In other embodiments, at least a portion of the fuel support comprises a grate, and at least a portion of the fuel support comprises a solid surface. For example, depicted in FIG. 2A is a fuel support comprising a grate. Depicted in FIG. 2B is an example of a fuel support comprising a grate and a solid surface.

Figure 7:
FIG. 7 is an image of a cookstove in which the fuel support is 25 mm from the floor of the combustion chamber, and at least a portion of the fuel support extends out through the side opening.

In some embodiments, the combustion apparatus has a fuel support comprising a grate and a solid surface, wherein the solid surface is located within the combustion space adjacent to the side opening. In other embodiments, at least a portion of the solid surface extends from within the combustion chamber through the side opening. For example, FIG. 7 depicts a combustion apparatus with a fuel support comprising a solid surface, wherein at least a portion of the solid surface extends out of the side opening. In some embodiments, the extension of the fuel support outside the combustion chamber is configured to support pieces of fuel. In some embodiments, these pieces of fuel cannot fit entirely within the combustion chamber, such as long wooden sticks or branches.

In some embodiments, the fuel support comprises a grate and a solid surface, wherein the grate is located within the combustion chamber adjacent to the wall opposite the side opening. In certain variations, orienting the fuel support in this way allows unburned char to accumulate on the grate, while fresh fuel is fed into the combustion chamber through the side opening. As described above, primary air may then enter the combustion chamber underneath the fuel support, and pass up through the grate to first contact the unburned char before contacting the fresh fuel. This results in combustion of the unburned char, and increases the total combustion efficiency of the fuel.

In one embodiment, the fuel support comprises a grate, wherein the grate has slits of 6 mm or less in width.

Combustion Chamber

Referring again to FIG. 1, apparatus 100 has a combustion chamber with an inner wall which forms a floor, a side opening, and an outlet. The side opening is configured to receive fuel into the combustion chamber, and the outlet is configured for combustion products to exit the chamber. These combustion products may be, for example, smoke, heat, flame, or one or more gases, or any combinations thereof. The inner wall of the combustion chamber defines a combustion space in which combustion of fuel and/or combustible gases occurs.

The floor of the combustion chamber is a solid surface without air inlets. In some embodiments, this results in the side opening being the only source of primary air flowing into the combustion space. Thus, in some embodiments, the flow of air, combustible gases, and/or combustion products through the combustion apparatus is in the same general direction—into the combustion apparatus through the side opening and secondary air holes, along a vertical path through the combustion space, and exiting the outlet.

The combustion chamber may be any shape or size that allows air to enter the chamber through the side opening, combustion products to exit the outlet, and combustion to take place within the combustion space. In certain embodiments, the inner wall of the combustion chamber defines a cylindrical combustion space. In some variations, the combustion space is a uniform shape throughout (e.g., a right cylinder), while in other embodiments the shape or dimensions of the combustion space are not uniform. In certain embodiments, the combustion space above the airflow disk is of a different shape than that below the airflow disk.

In one embodiment, at least a portion of the combustion space is cylindrical. In one embodiment, at least a portion of the combustion space below the airflow disk is cylindrical. In another embodiment, the entire combustion space below the airflow disk is cylindrical. In one embodiment, at least a portion of the combustion space above the airflow disk is cylindrical. In certain embodiments, the entire combustion space above the airflow disk is cylindrical. In some embodiments, the combustion space is cylindrical and has a similar circumference throughout. In another embodiment, the circumference of the cylindrical combustion space, or of the combustion space above the airflow disk, narrows approaching the outlet of the combustion chamber. In certain embodiments, a combustion space that is cylindrical above the airflow disk produces greater heat during fuel combustion than a chamber of a different shape.

In one embodiment, the combustion chamber is 220 mm, 245 mm, or 270 mm in height. In another embodiment, the combustion chamber comprises a cylinder of 110 mm, 150 mm, or 180 mm in diameter. In yet another embodiment, the combustion space above the airflow disk is cylindrical, wherein the circumference above the airflow disk is 150 mm, the circumference at the outlet is 110 mm, and the height between the two circumferences is 50 mm.

The inner wall of the combustion chamber may be formed of any suitable material, including, for example, metal. In one embodiment, at least a portion of the inner wall of the combustion chamber is metal.

In some embodiment, the combustion chamber comprises one or more connected components. For example, in one embodiment, the combustion chamber comprises a lower component below the airflow disk, and an upper component above the airflow disk. These components may be assembled or joined to form the combustion chamber as described above. In one embodiment, the combustion chamber comprises two or more separate components which are formed or manufactured separately, and are then joined together to form the combustion chamber of the combustion apparatus as described herein.

Side Opening

The combustion apparatus has a side opening located between the floor of the combustion chamber and the airflow disk. In some embodiments, the side opening is configured to receive fuel.

As described above, the side opening allows a user to add, remove, or otherwise tend to fuel during operation of the apparatus. For example, during use of the apparatus, a user may add fuel through the side opening to extend cooking time, or a user may remove remaining fuel to stop use of the apparatus once cooking has been completed. This flexibility may increase fuel efficiency, as the user can determine that fuel is burned only when needed.

The side opening is configured to receive fuel, which may be, for example, larger pieces of solid fuel such as wooden sticks, branches, or logs. The side opening may be any shape or size to allow fuel to be fed into the combustion chamber, and for primary air to flow into the combustion space underneath the fuel as described above. In certain embodiments, the side opening is a square opening. In one embodiment, the side opening is a square opening between 80 mm and 110 mm in height and between 100 mm and 140 mm in width.

In addition, as described above, in some embodiments the amount of primary air that passes the fuel can affect the burn rate. In certain embodiments, fuel burn rate is between 5 to 25 grams of fuel per minute, or between 12 to 15 grams of fuel per minute. In some embodiments, the fuel burn rate is 15 grams per minute. In some embodiments, the fuel is biomass, such as wood.

Housing Unit

Referring again to FIG. 1, in some variations, apparatus 100 further has housing unit 116, which has a top surface, bottom surface, and an outer wall. In certain variations, the top surface of housing unit 116 has a first opening contiguous with the outlet of the combustion chamber, and the outer wall of housing unit 116 has a second opening contiguous with the side opening of the combustion chamber. Thus, in certain embodiments, apparatus 100 has a combustion chamber and a housing, with a side opening in the housing and combustion chamber through which solid fuel can be fed, and an outlet at the top of the combustion chamber and housing through which combustion products may exit. An example of a combustion apparatus comprising a housing unit with a first opening contiguous with the outlet of the combustion chamber may be seen in FIG. 9 (left image).

Figure 9:
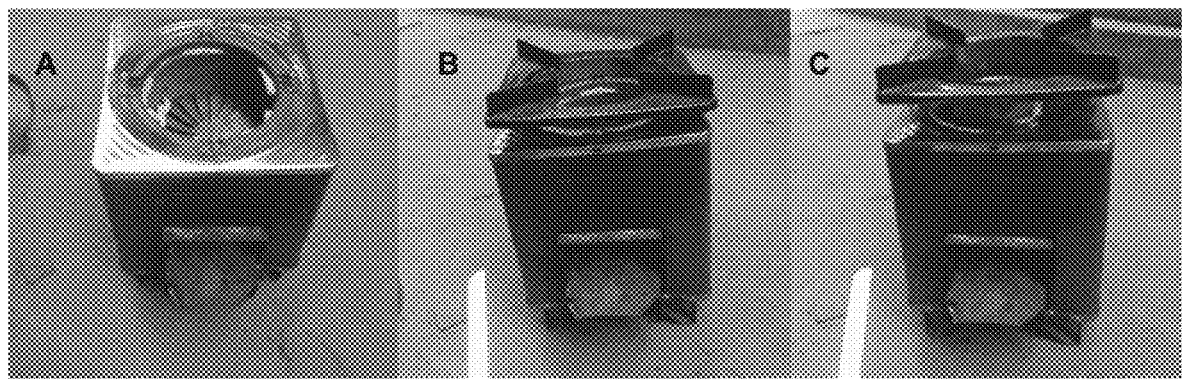
FIG. 9 depicts images of Cookstove 1.30 (left image), Cookstove 1.31 (middle image), and Cookstove 1.32 (right image).

In other variations, the top surface of the housing unit comprises a first opening, wherein the combustion chamber extends through the first opening. For example, shown in FIG. 9 are two cooking apparatuses that comprise a housing unit, wherein the combustion chamber extends through a first opening in the top of the housing unit (middle and right images).

In certain variations, the apparatus comprises a housing unit with at least one secondary air inlet at the bottom of the house, wherein the secondary air inlet is located between the combustion chamber and the outer wall of the housing unit. In some embodiments, there is at least one space between at least a portion of the outer wall of the housing unit and the combustion chamber. This space is connected to one or more of the secondary air holes of the combustion chamber, and to one or more secondary air inlets located on the bottom surface of the housing unit. During combustion of fuel, air is drawn through the secondary air inlets and into the space between the housing unit and the combustion chamber, where it is heated due to proximity to the combustion chamber before passing through the secondary air holes and into the combustion space. The heating of secondary air prior to entering the combustion space leads to an increase in the temperature of the gases in the combustion zone, which may lead to increased combustion performance such as increased fuel efficiency or higher output temperatures.

Referring again to FIG. 1, apparatus 100 has secondary air inlets 118 at the bottom of the housing unit. The space between the outer wall of housing unit 116 and the combustion chamber is contiguous with at least one secondary air hole 110, and is also contiguous with the secondary air inlet 118. In some variations, secondary air is heated as it flows from the secondary air inlet 118 through the secondary air hole(s) 110 and into the combustion space.

In some variations, the walls of the housing unit are insulated to keep the housing unit cooler than the combustion chamber.

Additional Components

It should be understood that, in some embodiments, a combustion apparatus as described herein may comprise one or more additional components.

For example, in some embodiments, the combustion apparatus further has a ring configured to support the airflow disk, wherein the ring is located within the combustion chamber and contacts the inner wall defining the combustion space. In one variation, this ring is a metal ring less than 10 mm in width. Including a support ring in the combustion apparatus may make it easier for a user to remove the airflow disk from the combustion chamber, for example to replace the airflow disk or to clean or otherwise maintain the combustion chamber.

In other embodiments, the combustion apparatus further has a movable door attached to the outside of the combustion chamber, wherein the door is configured to at least partially cover the side opening. In some variations, the combustion apparatus comprises a housing unit, and the door is attached to the housing unit. A movable door may be included in certain embodiments so that a user can load the cookstove with fuel through the side opening and then adjust the door to cover at least a portion of the side opening above the fuel support, reducing the amount of primary air that enters the side opening above the fuel support. By reducing the primary air intake above the fuel, a higher percentage of primary fuel may enter below the fuel support, which may in some embodiments improve fuel combustion as described above. In some embodiments, a movable door is attached above the side opening, or to the side of the side opening.

In still other embodiments, the combustion apparatus further comprises a cooking utensil support. In some embodiments, the cooking utensil support contacts the top surface of the housing unit. In other embodiments, the cooking utensil support contacts the combustion chamber. For example, FIG. 9 shows an image of a combustion apparatus in which the cooking utensil support contacts the top of the housing unit (left image), and combustion apparatuses in which the cooking utensil support contacts the combustion chamber (middle and right images).

This cooking utensil support is configured to support a cooking utensil, such as a cooking plate, a grill, a pot, a wok, a South Indian pot, or a Dutch oven, over the outlet of the combustion chamber. In some embodiments, the cooking utensil support has at least three points of contact or at least four points of contact with the cooking utensil it is supporting. In certain embodiments, wherein the cooking support has multiple points of contact, these points of contact are in a circular arrangement, and in some embodiments these points of contact are equally spaced. The cooking utensil support may be of any suitable height and comprise any suitable material to support a cooking utensil above the outlet. In certain embodiments, the cooking utensil support is metal.

Including a cooking utensil support allows, for example, a user to place a cooking utensil above the outlet of the combustion chamber without blocking the outlet of the combustion chamber. Raising the cooking utensil above the outlet may maintain the flow of air, combustible gases, and combustion products through the apparatus as described above. Thus, in certain embodiments, the cooking utensil support raises the bottom of the cooking utensil above the outlet and creates an area between the bottom of the cooking utensil and the outlet that is equal to or larger than the cross sectional area of the disk and the secondary air holes combined. Creating an area of this size may allow the combustion products to exit the combustion apparatus without impeding the flow of air and gases into and through the combustion chamber.

In some embodiments, the cooking utensil support holds the bottom of a cooking utensil at least 7 mm, at least 9 mm, at least 16 mm, at least 27 mm, between 7 mm and 27 mm, between 9 mm and 27 mm, or between 16 mm and 27 mm above the top of the combustion chamber.

Fuel

As described above, the combustion apparatus and method as described herein involve the combustion of solid fuel. Such fuels may be biomass. The biomass may be lignocellulosic biomass, including wood, branches, sticks, agricultural waste, foliage, or any combinations thereof. In some embodiments, the solid fuel comprises at least 10% water, at least 20% water, or between 10-20% water. It should be understood that solid fuel comprising other quantities of water may be used in certain embodiments (e.g., 5% water).

In some embodiments, the solid fuel used with the combustion apparatus and method described herein is used with minimal processing. The side opening of the combustion apparatus may be configured to allow feeding of large pieces of solid fuel, such as long sticks or branches, into the apparatus without requiring the fuel be broken up in to small pieces. However, it should be understood that in other embodiments, solid fuels such as biomass may undergo processing prior to use with the combustion apparatus or method as described herein. This processing may include, for example, chopping, cutting, or otherwise breaking into smaller pieces, stripping branches of leaves or pressing pieces of fuel together.

Method of Combustion

Figure 19:
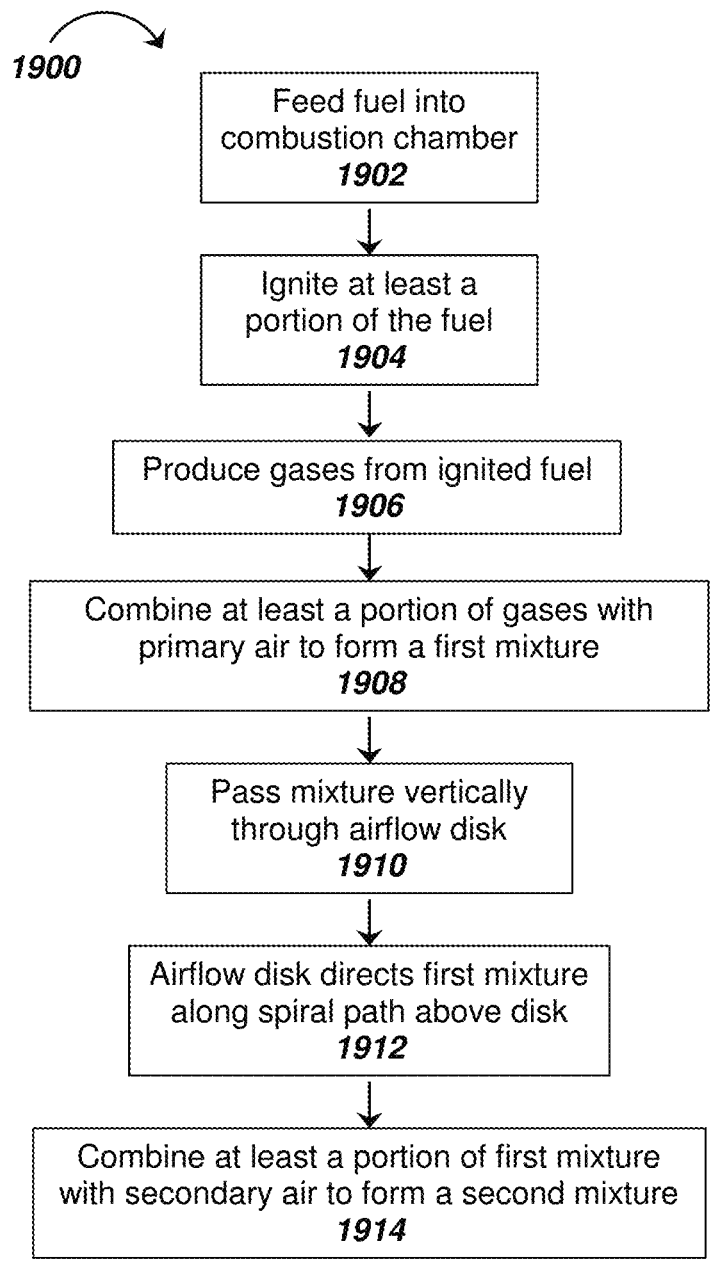
FIG. 19 depicts a flow diagram of an exemplary method for combusting solid fuel.

Further described herein is a method of combusting fuel. With reference to FIG. 19, a flow diagram of exemplary combustion method 1900 is depicted. Combustion method 1900 begins with feeding fuel into a combustion chamber in step 1902. Then, at least a portion of the fuel is ignited in 1904, to produce gases in 1906. In step 1908, at least a portion of the gases are combined with primary air to form a first mixture. In some embodiments, the primary air enters the combustion chamber from below the fuel. The first mixture is passed in 1910 through an airflow disk, which 1912 directs the first mixture along a spiral path above the disk. Then, at least a portion of the first mixture is combined with secondary air to form a second mixture in step 1914. In some embodiments, the gases produced from the ignited fuel are combustible gases. As described above, the secondary air enters the combustion chamber above the airflow disk.

Thus, described herein is a method of combusting fuel, comprising:
feeding fuel into a combustion chamber;
igniting at least a portion of the fuel within the combustion chamber to produce combustible gases;
combining at least a portion of the combustible gases with primary air to form a first mixture, wherein the primary air enters the combustion chamber below the fuel;
passing the first mixture vertically through an airflow disk, wherein the airflow disk directs the first mixture along a spiral path above the airflow disk; and
combining at least a portion of the first mixture with secondary air to form a second mixture, wherein the secondary air enters the combustion chamber above the airflow disk.

It should be understood that in some embodiments, process 1900 includes one or more additional steps. In some variations, the airflow disk directs the first mixture in a horizontal direction above the airflow disk. In some variations, the primary air also enters the combustion chamber above the fuel. In some embodiments, the second mixture produces heat. In certain embodiments, the method produces flame, for example from at least a portion of the second mixture, at least a portion of the first mixture, or a combination thereof. This heat and/or flame may be applied, for example, to a cooking utensil such as a cooking plate, a grill, a pot, a wok, a South Indian pot, or a Dutch oven.

In another embodiment, described herein is a method of combusting fuel including:
feeding fuel into a combustion chamber;
igniting at least a portion of the fuel within the combustion chamber;
contacting at least a portion of the ignited fuel with primary air to produce combustible gases, wherein the primary air enters the combustion chamber below the fuel;
passing the combustible gases vertically through an airflow disk, wherein the airflow disk directs the combustible gases along a spiral path above the airflow disk; and
combining at least a portion of the combustible gases with secondary air to form a mixture, wherein the secondary air enters the combustion chamber above the airflow disk.

In some variations, the airflow disk directs the combustible gases in a horizontal direction above the airflow disk. In some variations, the primary air also enters the combustion chamber above the fuel. In other variations, the primary air mixes with the combustible gases to form an initial mixture which passes through the airflow disk. In some embodiments, the mixture of combustible gases and secondary air produces heat, flame or a combination thereof. This heat and/or flame may be applied, for example, to a cooking utensil such as a cooking plate, a grill, a pot, a wok, a South Indian pot, or a Dutch oven.

In certain embodiments which may be combined with any previous embodiment, the heat produced by the method is applied to a cooking utensil, such as a cooking plate, a grill, a pot, a wok, a South Indian pot, or a Dutch oven. In some embodiments, the fuel is continuously fed into the combustion chamber during combustion, while in other embodiments the fuel is removed from the combustion chamber, for example to halt combustion. In certain embodiments, the primary air enters the combustion chamber perpendicular to the air flow through the airflow disk. In some embodiments, the method further comprises passing the primary air through a fuel support grate to contact the ignited fuel.

In other embodiments, the method further comprises heating the secondary air prior to entering the combustion chamber. As described above, this may comprise directing the secondary air to contact the external surface of the combustion chamber prior to entering the combustion chamber. Heating the secondary air prior to entering the combustion chamber may increase the temperature inside the combustion chamber, increasing combustion efficiency.

In some embodiments, the method further comprises producing flame from at least a portion of the first mixture, or from at least a portion of the combustible gases. This flame may be passed through the airflow disk, wherein the airflow disk directs the flame in a horizontal direction relative to the flow through the disk. In some embodiments, the flame is directed in a spiral path above the airflow disk. As described above, carrying out this method of fuel combustion produces, in some embodiments, a helical or spiral flame, as depicted, for example, in FIG. 15. The production of a helical or spiral flame may be a visually appealing aspect of the combustion method described herein.

In some embodiments, the combustion apparatus or combustion method as described herein produces less than 50 mg/MJd particulate matter, less than 100 mg/MJd particulate matter, less than 150 mg/MJd particulate matter, less than 200 mg/MJd particulate matter, less than 250 mg/MJd particulate matter, less than 300 mg/MJd particulate matter, less than 350 mg/MJd particulate matter, less than 400 mg/MJd particulate matter, between 50 mg/MJd and 150 mg/MJD particulate matter, between 50 mg/MJd and 100 mg/MJD particulate matter, or between 250 mg/MJd and 400 mg/MJd particulate matter, or between 250 mg/MJd and 350 mg/MJd particulate matter. In one embodiment, the combustion apparatus or combustion method as described herein produces less than 50 mg/MJd particulate matter, or less than 100 mg/MJd particulate matter. The units of mg/MJd particulate matter express milligrams of particulate matter per Mega Joule of heat delivered to a cooking utensil, such as a pot.

In some embodiments, the combustion apparatus or combustion method as described herein produces less than 2 g/MJd carbon monoxide, less than 5 g/MJd carbon monoxide, less than 7 g/MJd carbon monoxide, less than 10 g/MJd carbon monoxide, or between 5 g/MJd and 10 g/MJd carbon monoxide. In one embodiment, the combustion apparatus or combustion method as described herein produces less than 2 g/MJd carbon monoxide. The units of g/MJd carbon monoxide express grams of carbon monoxide per Mega Joule of heat delivered to a cooking utensil, such as a pot.

In some embodiments, the combustion apparatus or combustion method as described herein has at least 20% thermal efficiency, at least 25% thermal efficiency, at least 30% thermal efficiency, at least 35% thermal efficiency, at least 40% thermal efficiency, between 20% to 40% thermal efficiency, or between 25% to 35% thermal efficiency as a ratio of cooking power (energy into the pot) divided by fire power (energy released by the fuel).

ENUMERATED EMBODIMENTS

The following enumerated embodiments are representative of some aspects of the invention.

1. A combustion apparatus comprising a combustion chamber, a fuel support, and an airflow disk, wherein:
    the combustion chamber comprises:
        an inner wall defining a combustion space, and forming a floor, a side opening, and an outlet;
            wherein the outlet is positioned opposite the floor, and the side opening is located between the floor and the outlet; and
            wherein the inner wall comprises a plurality of secondary air holes located between the outlet and the side opening;
    the fuel support comprises a grate, and the fuel support is located between the top and bottom of the side opening wherein at least a portion of the fuel support is located within the combustion chamber above the floor; and
    the airflow disk is located between the side opening and the secondary air holes, comprises a plurality of blades joined at the center of the airflow disk, and is configured to allow combustion gases to flow through the disk.

2. The combustion apparatus of embodiment 1, further comprising a housing unit, wherein the housing unit comprises a top surface, a bottom surface, and an outer wall, wherein:
    the top surface of the housing unit comprises a first opening;
        wherein the first opening is contiguous with the outlet, or wherein the combustion chamber extends through the first opening; and
    the outer wall comprises a second opening contiguous with the side opening of the combustion chamber.

3. The combustion apparatus of embodiment 2, wherein:
    there is at least one space between at least a portion of the outer wall and at least a portion of the combustion chamber;
    the bottom surface of the housing unit comprises at least one secondary air inlet located between the outer wall and the combustion chamber; and
    the at least one secondary air inlet is contiguous with the at least one space and at least one secondary air hole of the combustion chamber.

4. The combustion apparatus of any one of embodiments 1 to 3, wherein at least a portion of the fuel support extends out of the combustion chamber through the side opening.

5. The combustion apparatus of any one of embodiments 1 to 4, wherein the fuel support comprises a solid surface, and at least a portion of this solid surface is located within the combustion chamber adjacent to the side opening.

6. The combustion apparatus of any one of embodiments 2 to 5, further comprising a cooking utensil support, wherein the cooking utensil support is located above the first opening and contacts the top surface of the housing unit, the top of the combustion chamber, or both.

7. The combustion apparatus of any one of embodiments 1 to 6, further comprising a ring, wherein the ring contacts the inner wall of the combustion chamber and is configured to support the airflow disk.

8. The combustion apparatus of any one of embodiments 1 to 7, wherein the secondary air holes are regularly spaced along the inner wall of the combustion chamber.

9. The combustion apparatus of any one of embodiments 1 to 8, wherein the cross sectional area of air flow through the airflow disk is between 10% to 20% of the cross sectional area of the air flow through the combustion chamber.

10. The combustion apparatus of any one of embodiments 1 to 9, wherein at least a portion of each blade is rotated between 15 to 30 degrees from the plane of the center of the disk 11. The combustion apparatus of any one of embodiments 1 to 10, wherein the combustion space is cylindrical.

12. The combustion apparatus of any one of embodiments 1 to 10, wherein the combustion space below the airflow disk is cylindrical, the combustion space above the airflow disk is conical, and the diameter of the conical combustion space decreases approaching the outlet.

13. The combustion apparatus of any one of embodiments 2 to 12, further comprising a door connected to the outer wall of the housing unit and configured to cover at least a portion of the second opening.

14. The combustion apparatus of any one of embodiments 1 to 13, wherein the size of the side opening is between 80 mm and 110 mm in height and between 100 mm and 140 mm in width.

15. The combustion apparatus of any one of embodiments 1 to 14, wherein the fuel is biomass.

16. The combustion apparatus of any one of embodiments 1 to 15, wherein the side opening is configured to receive fuel.

17. The combustion apparatus of embodiment 16, wherein the side opening is configured to receive fuel continuously.

18. A method of combusting fuel, comprising:
    combining combustible gases with primary air to form a first mixture in a combustion chamber, wherein the combustible gases are produced from fuel within the combustion chamber, and wherein the primary air enters the combustion chamber above and below the fuel;

passing the first mixture vertically through an airflow disk, wherein the airflow disk directs the first mixture along a spiral path above the airflow disk; and combining at least a portion of the first mixture with secondary air to form a second mixture, wherein the secondary air enters the combustion chamber above the airflow disk.

19. The method of embodiment 18, wherein the second mixture produces heat.

20. The method of embodiment 19, wherein the heat is applied to a cooking utensil.

21. The method of any one of embodiments 18 to 20, wherein the primary air enters the combustion chamber perpendicular to the air flow through the airflow disk.

22. The method of any one of embodiments 18 to 21, further comprising heating the secondary air prior to entering the combustion chamber.

23. The method of any one of embodiments 18 to 22, further comprising producing flame from at least a portion of the first mixture.

24. The method of embodiment 23, further comprising passing the flame through the airflow disk, wherein the airflow disk directs the flame along a spiral path above the airflow disk.

25. The method of any one of embodiments 18 to 24, further comprising feeding the fuel into the combustion chamber.

26. The method of embodiment 25, wherein the fuel is continuously fed into the combustion chamber during combustion.

27. The method of any one of embodiments 18 to 26, further comprising igniting at least a portion of the fuel within the combustion chamber to produce the combustible gases.

EXAMPLES

The following Examples are merely illustrative and are not meant to limit any aspects of the present disclosure in any way.

Particulate matter (PM) and carbon monoxide (CO) were measured as concentrations. Using exhaust flow measurements, the concentration of PM and CO were calculated as mass flow using calculations from the Water Boiling Test (WBT) version 4.2.3 developed by the Global Alliance for Clean Cookstoves. Emission performance is expressed in milligrams of particulate matter per Mega Joule of heat delivered to a cooking pot (PM-P in mg/MJd), and grams of carbon monoxide per Mega Joule of heat delivered to a cooking pot (CO-P in g/MJd). Emissions are also expressed as total accumulated weight over time.

The ratio of carbon monoxide to carbon dioxide is expressed as COr, and calculated by dividing the quantity of CO by the quantity of $CO_2$. The ratio of carbon monoxide to carbon dioxide is expressed as COr-P. The amount of excess air in combustion is expressed by EA. Methods of evaluating cookstove performance below include the Water Boiling Test (WBT) version 4.2.3 developed by the Global Alliance for Clean Cookstoves, using The Heterogeneous Testing Protocol (HTP) for Thermal Performance and Trace Gas Emissions revised Feb. 16, 2012 as developed by the SeTAR Centre at the University of Johannesburg Bunting Road Campus. Certain cookstoves were rated based on the Organization for Standarisation (ISO) International Workshop Agreement (IWA) tier rating system for cookstoves, wherein Tier 0 indicates the lowest performance and Tier 4 indicates the highest performance. The WBT 4.2.3 protocol has been mapped to the ISO IWA tiers.

Certain cookstove performance characteristics, including particulate matter (PM), CO, and $CO_2$ were measured using a portable emission measurement system (PEMS; Aprovecho Research Center) and Enerac 700 gas analyzer.

Cooking power as reported below is the total energy increase of the cooking pot and its contents (such as water) measured per second. This was calculated by determining the specific heat capacity of the pot and contents (in J/K), and multiplying it by the average temperature increase per second of the pot and contents during cookstove operation to arrive at cooking power in Watts (J/sec).

Fire power as reported below is the energy released by the fuel per second. This was determined by first calculating the energy in Mega Joules (MJ) released by burning a kilogram of fuel. This calculation is based on the measured fuel moisture content and the reported dry fuel calorific values. It should be understood that this value can vary depending on the type and humidity level of the fuel. The burn rate in grams per second (g/sec) of the fuel during cookstove operation is measured by monitoring the weight of the cookstove and fuel with a scale during use. The energy released by the fuel was converted to J/g and multiplied by the burn rate to provide fire power in J/sec.

Cookstoves were tested at different cooking power levels. The cooking power level was controlled by the number of wood sticks loaded into the stove. Cooking power is the energy going into the pot over time (e.g., seconds), and fire power is the energy released by the wood over time (e.g., seconds). Thermal efficiency as described below was calculated by dividing cooking power by fire power, multiplied by 100%. The amount of energy released by the fire but not entering the pot is loss.

The fuel used in the following tests was Casuarina, a common fuel wood in South India. The sticks are generally 2 cm to 5 cm in diameter and 0.5 m to 1.5 m in length. The moisture content of the wood commonly ranges from 5% to 25%.

A series of cookstoves were assembled and tested. Each cookstove included a combustion chamber with side opening, outlet, and secondary air holes; an airflow disk; a fuel support; a housing unit with secondary air inlets on the bottom; and a cooking utensil support as described above. The dimensions and cross-sectional air flow of different components used to construction the cookstoves are provided in Table 1 below. The components (e.g., combustion chamber, airflow disk, and fuels support) used in the different tested cookstoves are provided in Table 2 below.

TABLE 1

Dimensions and air flow through cookstove components.

| Fuel Support | Units | Leo Grate | New grate 1.0 | New grate 1.1 |
|---|---|---|---|---|
| Height | mm | 30 | 40 | 25 |
| Width | mm | 110 | 105 | 105 |
| Depth | mm | 160 | 235 | 235 |
| Air entry under the front of the grate | $mm^2$ | 1950 | 4140 | 2587.5 |
| Air exit upwards through the grate | $mm^2$ | 3600 | 6154.4 | 6154.4 |
| Air exit location | | Evenly throughout depth | Only under round area c chamber | Only under round area c chamber |
| Material thickness | mm | 7 | 1 | 1 |

TABLE 1-continued

Dimensions and air flow through cookstove components.

| Airflow Disk | | d01 | d02 | d03 | d04 |
|---|---|---|---|---|---|
| Diameter | mm | 140 | 140 | 135 | 135 |
| Number of blades | | 6 | 7 | 18 | 18 |
| Min area through disk | mm² | 2100 | 4200 | 4050 | 2160 |
| Min area through disk on 120 mm | mm² | 2100 | 2520 | 3420 | 2052 |
| Thickness and material | mm | | | | 1.2 SS310 |

| Combustion Chamber | | C01 | C02 | C03 | C04* |
|---|---|---|---|---|---|
| Diameter | mm | 150 | 150 | 150 | 150 |
| Height | mm | | 230 | 230 | 230 |
| Side opening height | mm | 90 | 90 | 90 | 90 |
| Side opening width | mm | 120 | 120 | 120 | 120 |
| Secondary air hole number | | 16 | 12 | | 12 |
| Secondary air hole size (each) | mm² | 225 | 180 | | 28.26 |
| Secondary hole size total | mm² | 3600 | 2461.44 | 0 | 339.12 |
| Secondary air inlet | mm² | 5205.76 | 5205.76 | | 5205.76 |
| Secondary tunnel cross section | mm² | 11053 | 11053 | | 11053 |

*The chamber above the airflow disk was made from terracotta.

TABLE 2

Cookstove components used to assemble different tested cookstoves.

| Cookstove | Grate | Disk | Combustion Chamber | Description |
|---|---|---|---|---|
| Cookstove 1.00 | Slotted sheet | D01 | C01 | |
| Cookstove 1.10 | Leo | D01 | C02 | |
| Cookstove 1.11 | New grate 1.1 | D03 | C02 | |
| Cookstove 1.12 | New grate 1.1 | D03 | C02 | Block secondary air |
| Cookstove 1.13 | New Grate 1.0 | D03 | C02 | |
| Cookstove 1.13 | New Grate 1.0 | D03 | C02 | |
| Cookstove 1.20 | New Grate 1.0 | D03 | C02 | |
| Cookstove 1.30 | New Grate 1.0 | D03 | C04 | |
| Cookstove 1.31 | New Grate 1.0 | D03 | *C04 | *Combustion chamber height increased by 25 mm |
| Cookstove 1.32 | New Grate 1.0 | D03 | C04 | *Combustion chamber height increased by 50 mm |
| Cookstove 1.34 | New Grate 1.0 | D04 | *C04 | |

Cookstoves 1.00, 1.10, 1.11, 1.12, 1.13, 1.20, 1.30, 1.31, 1.32, and 1.34 refer to exemplary embodiments of the combustion apparatus as described herein.

Example 1

Closed Bottom Cookstove

This example demonstrates the performance parameters of a cookstove with a closed bottom.

The efficiency of a cookstove including a fuel support, combustion chamber with a closed bottom, and housing unit with cooking utensil support was tested at different power levels. This cookstove included an airflow disk. The cookstove is shown in FIG. 4A and FIG. 4B, with a 5 L South Indian Pot placed on top of the cookstove. The fire power and thermal efficiency at different cooking power levels is listed below in Table 3.

TABLE 3

Performance data of a cookstove with a closed bottom.

| | Cooking Power (Watts) | Fire Power (Watts) | Thermal Efficiency |
|---|---|---|---|
| Pot 1 | 1791 | 6049 | 29.9% |
| Pot 2 | 1253 | 4133 | 30.5% |
| Pot 3 | 914 | 2929 | 31.3% |

The pots tested with this cookstove accumulated less soot on the bottom (were cleaner) than has been previously observed using stoves with open-bottomed combustion chambers. Pot 3 tested at approximately 900 Watts was especially clean. Efficiencies of about 30% are high considering the use of 5 L South Indian Pots.

Example 2

Cookstove 1.00

Figure 5:
FIG. 5 is an image of the Cookstove 1.00.

This example demonstrates the operation parameters of an exemplary combustion apparatus referred to as "Cookstove 1.00", the initial open-bottomed cookstove evaluated. An image of Cookstove 1.00 is shown in FIG. 5. Cookstove 1.00 included a cylindrical combustion chamber of 150 mm in diameter, cooking utensil supports of 16 mm in height, a fuel support grate, and an airflow disk including blades connected at the circumference of the disk. The Cookstove 1.00 also included a housing unit with secondary air inlets in the base, a space between the housing unit wall and the combustion chamber wall through which secondary air passed, and a cooking utensil support on the top surface.

Based on the dimensions of the various openings and components of Cookstove 1.00, the cross sectional areas of primary air flow entering the apparatus was calculated as follows: 1950 mm² cross sectional area primary air under the fuel support grate, and 8056 mm² cross sectional area primary air above the fuel support grate when fuel is absent, or 4026 mm² cross sectional area when fuel is present (when fuel is blocking part of the area). The cross sectional area of air flow through the airflow disk was calculated as 1620 mm². The cross sectional area of secondary air entering the apparatus was calculated as 5205.8 mm² into the secondary air inlet at the bottom of the housing; 3600 mm² cross sectional area through the secondary air holes; and 11053 mm² cross sectional area through the space between the housing unit wall and the combustion chamber wall, through which secondary air travels from the secondary air inlet to the secondary air holes.

The cooking utensil supports were set to 16 mm so that the cross sectional area of air flow it creates between the cooking utensil and the outlet is greater than the smallest cross sectional area in the complete path of the flow through the cookstove. In this cookstove, the smallest cross sectional area is that of the disk (1620 mm²) and secondary air holes (3600 mm²) combined (5220 mm² total). This value was increased by approximately 50%, resulting in an area between the cooking utensil and cookstove of 7500 mm². This cross sectional area is a cylindrical shape with a diameter of 150 mm, and therefore a 16 mm tall cooking utensil was used to create the desired cross sectional area of $(16 \text{ mm})*(150 \text{ mm}*3.14) \approx 7500 \text{ mm}^2$.

An image of the fuel support used in this cookstove is shown in FIG. 2A, and an image of the airflow disk is shown in FIG. 3A. Multiple tests were carried out with this cookstove, using Casuarina wood sticks as fuel. The results from different tests are shown in Table 4. Efficiency is given as firepower divided by cooking power, multiplied by 100%.

TABLE 4

Performance data of the Cookstove 1.00.

| Test section | MJ delivered | PM mg/MJd | CO g/MJd | Efficiency | Burn rate g/m | Firepower (W) |
|---|---|---|---|---|---|---|
| Start and 3 pots | 2.89 | 73.7 | 9.2 | | 8.7 | |
| pot 1 | 1.00 | 84.2 | 7.7 | 24.0% | 11.1 | 3020 |
| pot 2 | 0.95 | 50.3 | 9.4 | 25.3% | 13.5 | 3696 |
| pot 3 | 0.94 | 30.9 | 7.7 | 27.4% | 14.9 | 4072 |

Based on the data obtained from testing of this cookstove, it was determined that performance may improve if distance between the bottom of the side opening and the fuel support grate were increased to increase primary air entering the chamber under the grate and the fuel, as this might lead to a higher burn rate and reduced char build-up; using an airflow disk with larger openings and a greater angle to the fan blades, as this may increase mixing of combustible gases with secondary air, decrease PM, and decrease CO; make the space between the housing unit wall and the combustion chamber round in shape to improve secondary air flow, which may increase mixing, lower PM, and lower CO; and increase the height of the combustion chamber, which may lower PM and lower CO.

Example 3

Cookstove 1.10

This example demonstrates the effect that lengthening the height of the combustion chamber and using a fuel support with a solid surface has on the performance of a cookstove.

The exemplary cookstove used in this analysis referred to as "Cookstove 1.10" was similar to Cookstove 1.00 described in Example 2, but had an increased combustion chamber height and a fuel support that included both a grate section and a solid surface section. The amount of secondary air entering the combustion chamber was decreased relative to Cookstove 1.00. The secondary air holes included in this cookstove were created by forming cuts in the wall of the combustion chamber and bending portions of the metal; this metal portions formed flaps. This cookstove also included an airflow support ring inside the combustion chamber, so that airflow disks could more easily be switched during testing. Both airflow disks from FIG. 3A and FIG. 3B were tested in this cookstove.

The fuel support used in this cookstove is shown in FIG. 2B, where the solid surface is near the top of the image. When used in Cookstove 1.10, the solid section of the fuel support was adjacent to the side opening of the cookstove through which fuel was fed, and the grate section was adjacent to the combustion chamber wall opposite the side opening.

Figure 6A:
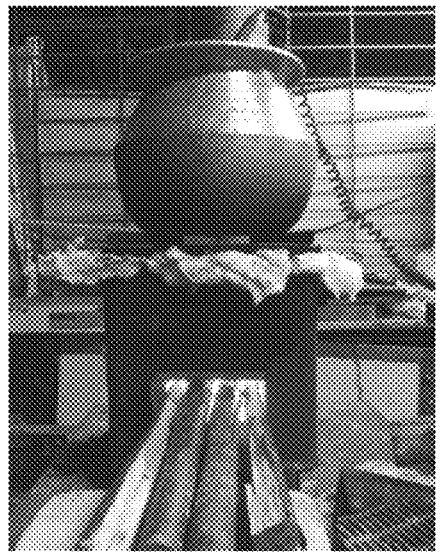
FIG. 6A is an image of the Cookstove 1.10 during evaluation of performance, with woody biomass used to heat a pot of water.
Figure 6B:
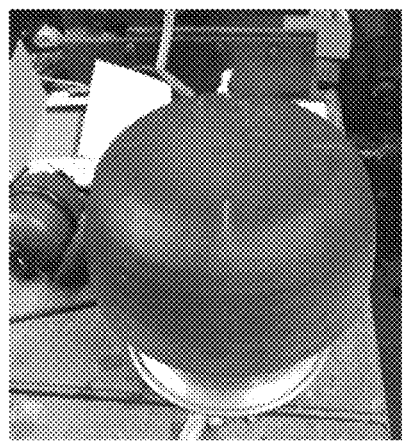
FIG. 6B is an image of the bottom of a pot used with the Cookstove 1.10 demonstrating little soot build up after use.

FIG. 6A is an image of Cookstove 1.10 during evaluation of performance, with woody biomass used to heat a pot of water. As shown in FIG. 6B, a pot used with Cookstove 1.10 showed little soot build up, and less than was observed with the shorter combustion chamber height of Cookstove 1.00.

Compared to the grate used in Cookstove 1.00 (shown in FIG. 2A), the grate used in Cookstove 1.10 resulted in less char build up during use, and a reduced fuel burn rate.

Shown in FIG. 3A and FIG. 3B are images of the airflow disks used in Cookstove 1.10. In the airflow disk in FIG. 3B, the blades are not connected at the circumference of the disk. In addition, the openings in this airflow disk are further from the center than in the disk used in Cookstove 1.00 (see FIG. 3A). It was observed that the flame produced by the disk in FIG. 3B was less concentrated and had less of a spiral pattern than the flame produced by the disk in FIG. 3A.

From observation of Cookstove 1.10, it was determined that additional cookstove components to assess included different airflow disks, blocking secondary air through the holes in the chamber, and lowering the fuel support to allow a greater quantity of fuel to be fed into the combustion chamber.

Example 4

Cookstove 1.11 and Cookstove 1.12

This example demonstrates the effect that blocking secondary air has on the performance of a cookstove. Exemplary cookstoves used in this example, referred to as "Cookstove 1.11" and "Cookstove 1.12", were similar to Cookstove 1.10 as described in Example 3, but the distance between the fuel support and the floor of the combustion chamber was decreased from 40 mm to 25 mm in both cookstoves, and the secondary air holes in the wall of the combustion chamber were blocked in the Cookstove 1.12. The decreased height of the fuel support can be seen in FIG. 7. All three airflow disks shown in FIG. 3C were tested. The performance parameters below were obtained during testing of these cookstoves is the right-most disk shown in FIG. 3C, marked as "d03".

Using the airflow disk "d03" in the cookstove produced improved visual results during use. The flame was more stable and had a more constant helical shape. It was not determined that reducing the fuel support from 40 mm to 25 mm had any effect on performance of Cookstove 1.11 and 1.12 compared to Cookstove 1.10.

Figure 15:
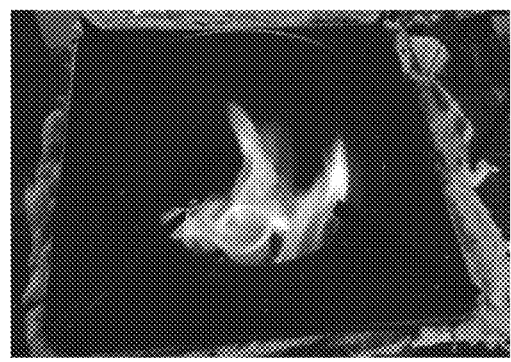
FIG. 15 depicts an image of the spiral flame generated by a combustion apparatus as described herein.

The performance of Cookstove 1.11 and Cookstove 1.12, including burn rate, firepower, and emission of combustion products, was measured using Casuarina wood as fuel. Both cookstoves were evaluated with a scale during combustion of fuel to determine the burn rate, as described above. The results are provided in Table 5. The spiral flames of Cookstove 1.11 during combustion are shown in FIG. 15.

TABLE 5

Performance data from Cookstove 1.11 and 1.12.

| Test | Cookstove 1.11 | Cookstove 1.12 |
|---|---|---|
| Burn rate (g/min) | 19 | 18 |
| Temp under pot (C) | 500 | 530 |
| CO (ppm) | 2230 | 10000 |
| $CO_2$ (%) | 3.44 | 6.6 |
| Cor | 0.065 | 0.152 |
| $O_2$ (%) | 17.3 | 13.5 |
| Excess Air % | 524 | 210 |

The CO levels measured using Cookstove 1.11 and Cookstove 1.12 were higher than the target range, indicating combustion was incomplete. The COr calculated for both Cookstove 1.11 and 1.12 was also higher than the target range. However, the percentage of excess air present in Cookstove 1.12 is within the desired range.

From this experiment, it was determined that a limited amount of secondary air which is well mixed with the combustible gases in the combustion chamber may improve cookstove performance. In addition, testing a cookstove over a range of different power levels may change the oxygen to fuel ratio, which could increase burn time and reduce CO levels. Increasing the height of the combustion chamber might affect the ratio of oxygen to fuel and affect CO emission, and changing the cooking utensil support might affect air flow through the cookstove.

Example 5

Cookstove 1.13

This example demonstrates the performance of a cookstove at two different power levels. The exemplary cookstove used in this example was referred to as "Cookstove 1.13", which was similar to Cookstove 1.12 as described in Example 4 above, but the distance between the fuel support and the floor of the combustion chamber was increased from 25 mm to 40 mm. This cookstove uses airflow disk "d03" as described above. The secondary air holes located on the wall of the combustion chamber were blocked with ceramic wool.

The burn rate and temperature under the cooking pot was measured using Cookstove 1.13 at two different power levels, which were generated by feeding different amounts of fuel into the side opening during use—two and a half sticks of Casuarina wood compared to two sticks of Casuarina wood.

Figure 10:
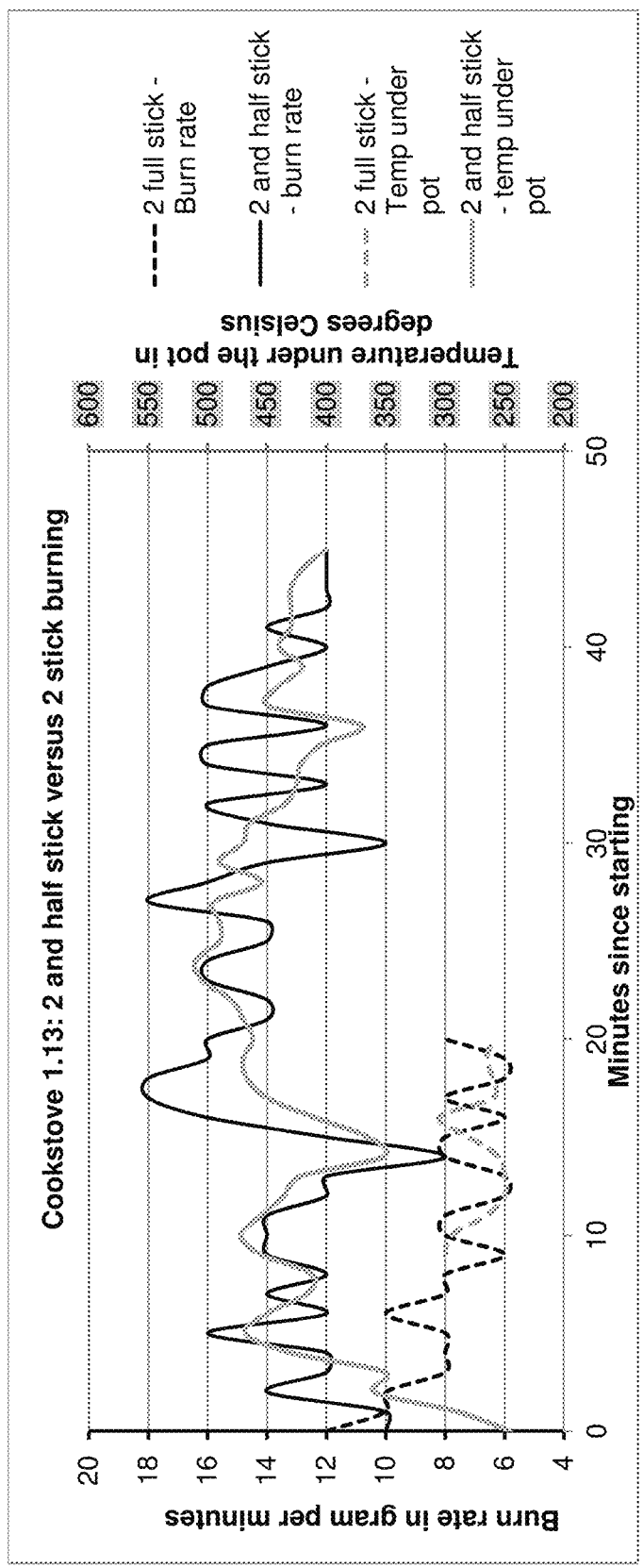
FIG. 10 is a graph depicting the burn rate and temperature under a cooking pot using Cookstove 1.13 at two different power levels.

The data obtained from this test is shown in the graph of FIG. 10, wherein the dotted lines represent the data from the two stick fuel test and the solid lines represent the data from the two and a half stick fuel test. The black lines are the burn rate of the fuel, and the grey lines are the temperature measured under the pot. These data demonstrate that a significant difference in temperature is observed with lower burn rate and that some smoke still persists. From this it was determined that changing the stove to always burn at a lower rate does not improve stove performance.

Example 6

Cookstove 1.20

This example demonstrates the effect of blocking the secondary air holes in the wall of the combustion chamber with ceramic wool. Secondary air was provided to the center of the combustion chamber above the disk by a pipe (see two white lines in FIG. 8A). Cookstove 1.20 cookstove is similar to Cookstove 1.12 of Example 4, but with the secondary air holes blocked as described above.

Figure 8A:
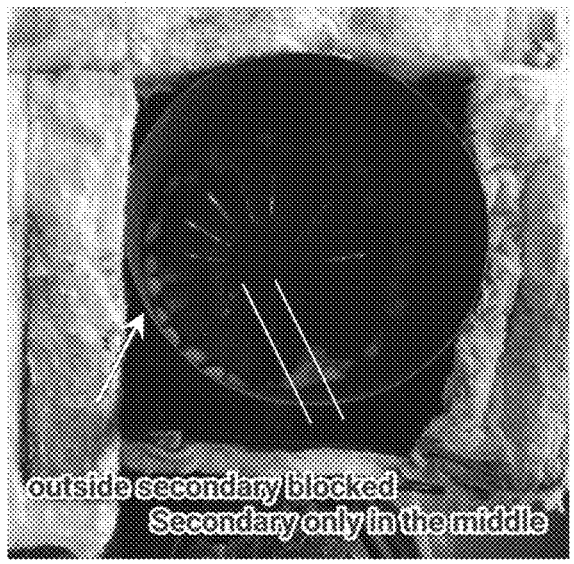
FIG. 8A is an image of Cookstove 1.20, in which secondary air holes in the chamber are blocked by ceramic wool. Secondary air is supplied to the center of the combustion chamber above the disk through a pipe indicated by the two white lines.
Figure 8B:
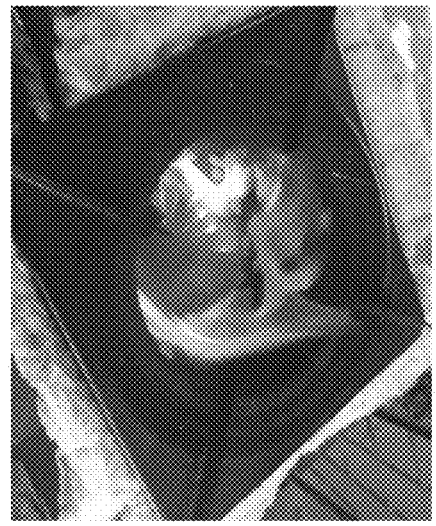
FIG. 8B is an image of the spiral flame produced by the Cookstove 1.20 during combustion.

An image of Cookstove 1.20 from the top, looking down into the combustion chamber through the outlet, is shown in FIG. 8A. As seen in this image, the secondary air holes in the chamber are blocked with cotton As seen in FIG. 8B, the spiral fire produced by Cookstove 1.20 during combustion is distorted by the secondary air entering the combustion chamber only from the pipe, directed at the backside of the chamber. This air distorts the circular movement of the gases passing through the airflow disk. No visual improvement in mixing or burn characteristics was observed. From this experiment, it was determined that introducing secondary air from the outside of the airflow disk may result in improved cookstove performance.

Example 7

Cookstove 1.3x Series

This example describes the components and performance of a series of similar exemplary cookstoves, referred to as "Cookstove 1.30", "Cookstove 1.31", "Cookstove 1.311", "Cookstove 1.312", "Cookstove 1.32", "Cookstove 1.321", and "Cookstove 1.322".

Cookstove 1.30 includes a 220 mm tall combustion chamber comprising a lower component with a wall made of metal below the airflow disk, and an upper component with a wall made of terra cotta above the airflow disk. The upper component includes 12 secondary air holes of a 6 mm diameter, drilled at an angle at regular intervals in the chamber wall. The upper component is made of terracotta. Cookstove 1.30 also includes cooking utensil supports which are 7 mm in height, a fuel support which includes a grate and a solid surface (as seen in FIG. 2B), and the airflow disk "d03" (as seen in FIG. 3C). The left image in FIG. 9 depicts Cookstove 1.30, in which the side opening, airflow disk, and secondary air holes can be seen. As seen in FIG. 9, a portion of the solid surface of the fuel support extends out through side opening.

Cookstove 1.31 and Cookstove 1.32 are similar to Cookstove 1.30, but have cooking utensil supports of 27 mm in height.

Cookstoves 1.31 and 1.32 have extended upper combustion chambers. The extensions were metal cylinders of diameter 180 mm and lengths 25 mm and 50 mm for Cookstoves 1.31 and 1.32, respectively. Cookstove 1.31 has a combustion chamber 25 mm longer than Cookstove 1.30. Cookstove 1.32 has a combustion chamber 50 mm longer than Cookstove 1.30. These extensions were included to determine the effect combustion chamber length may have on emissions and efficiency. FIG. 9 includes images of Cookstove 1.31 (middle image) and Cookstove 1.32 (right image), showing the longer combustion chamber and taller cooking utensil supports, compared to Cookstove 1.30 (left image in FIG. 9).

Cookstove 1.311 and Cookstove 1.321 are similar to Cookstove 1.31 and Cookstove 1.32, respectively, but each has a cooking utensil support of 7 mm in height and a 35 mm swinging door hanging from a bar attached horizontally at the top of the side opening.

Cookstove 1.302 is similar to Cookstove 1.30, but includes a 35 mm swinging door located hanging from a bar attached horizontally at the top of the side opening.

Figure 11:
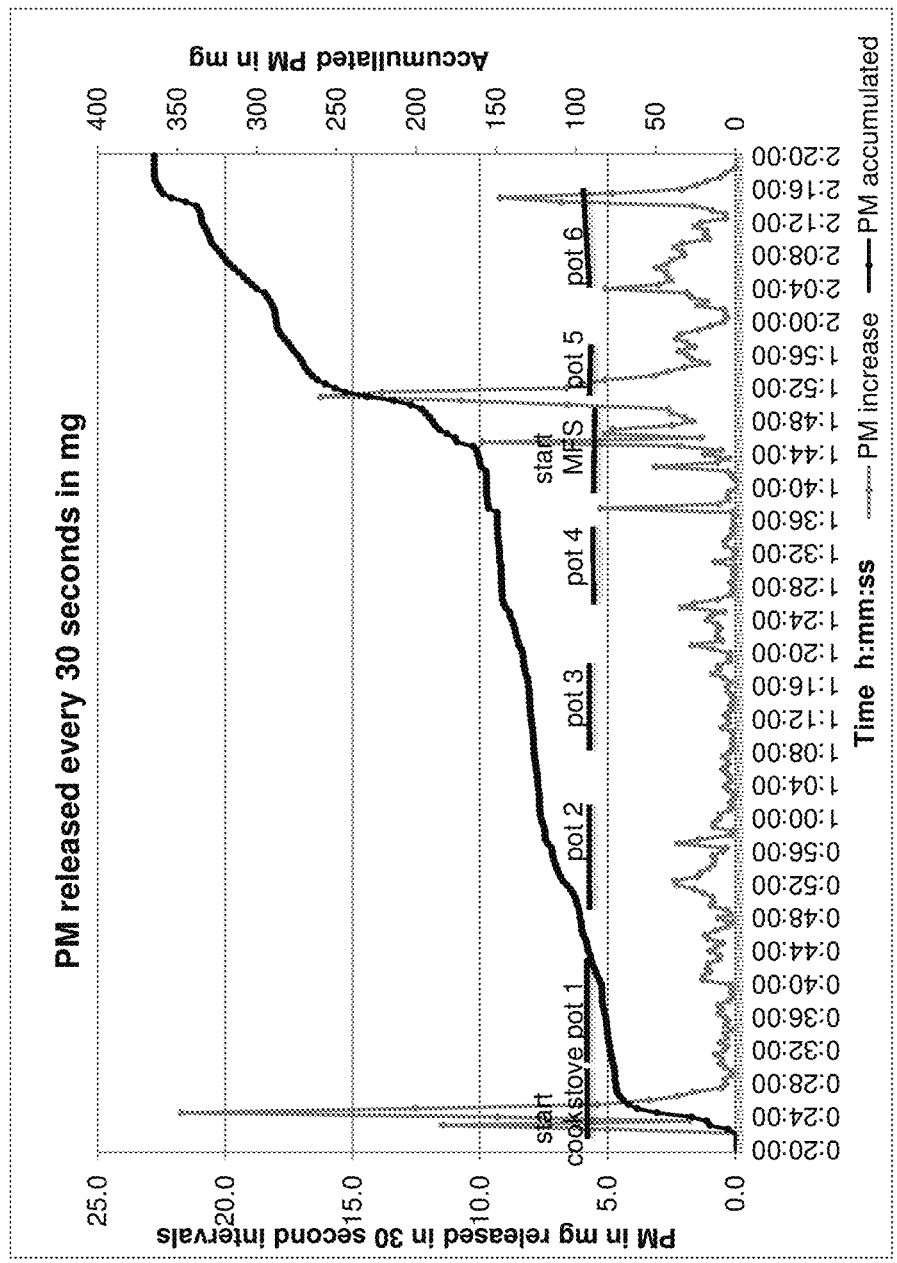
FIG. 11 is a graph depicting the emission of particulate matter (PM) during heating of a pot of water from about 25° C. to about 80° C. for Cookstove 1.32 (pot 1 and pot 2), Cookstove 1.31 (pot 3 and pot 4), and Multi Fuel Stove P4 (MFS P4; pot 5 and pot 6).
Figure 13:
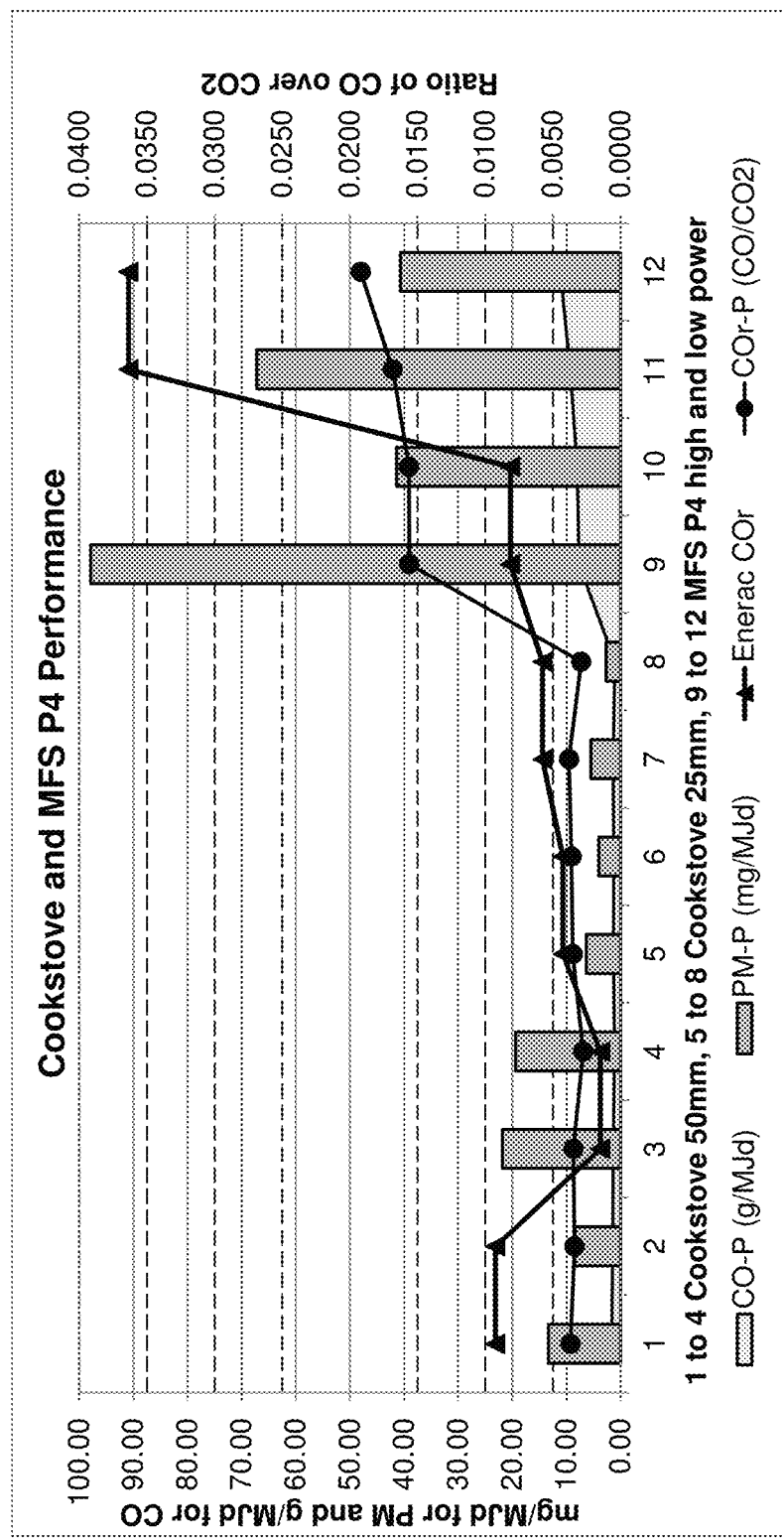
FIG. 13 is a graph depicting the ratio of CO emission to heat delivered to a cooking pot (CO-P), ratio of PM emission to heat delivered to a cooking pot (PM-P), and ratio of $CO/CO_2$ to heat delivered to a cooking pot (COr-P) for the Cookstove 1.32 (1-4), Cookstove 1.31 (5-8), and MFS P4 (9-12).

The performance of Cookstove 1.31 and Cookstove 1.32 were evaluated in comparison to a Multi Fuel Stove (MFS P4). The MFS P4 has a combustion chamber of similar dimensions and a similar outer housing to the other cookstoves tested in this example, but the MFS P4 does not have an airflow disk, and the bottom of the combustion chamber is open. Shown in FIG. 13 is a graph measuring the emission of particulate matter (PM) during heating of a pot of water from about 25° C. to about 80° C. Two pots were measured for each stove. In FIG. 11, "pot 1" and "pot 2" were heated by Cookstove 1.32, "pot 3" and "pot 4" were heated by Cookstove 1.31, and "pot 5" and "pot 6" were heated by the MFS P4.

Figure 12:
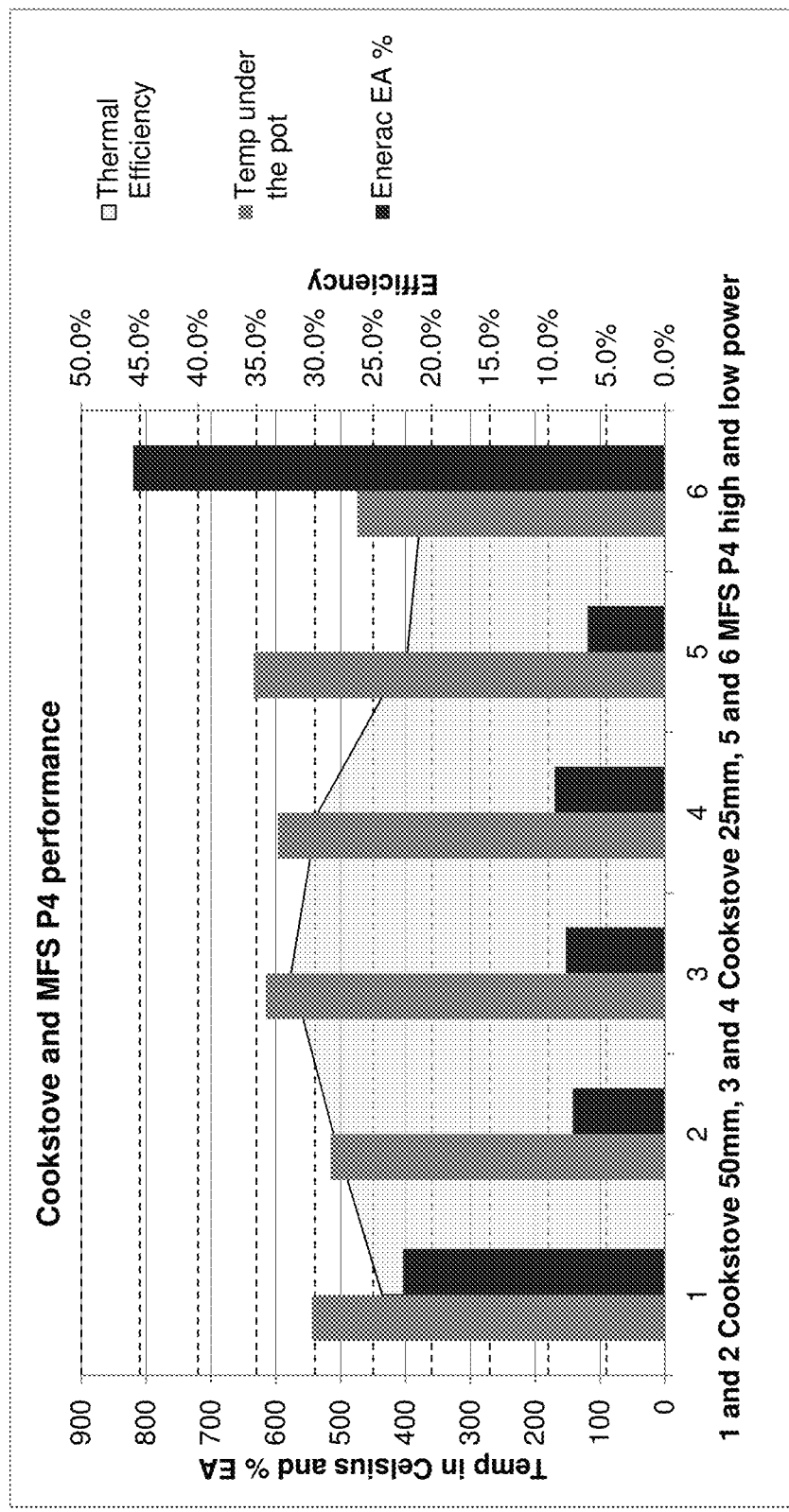
FIG. 12 is a graph depicting the thermal efficiency, temperature measured under the pot, and excess air (EA) during combustion for the Cookstove 1.32 (1 and 2), Cookstove 1.31 (3 and 4), and MFS P4 (5 and 6).

Shown in FIG. 12 is a graph depicting the thermal efficiency, temperature measured under the pot, and excess air (EA) in combustion for Cookstove 1.32 (1 and 2 on the horizontal axis), Cookstove 1.31 (3 and 4 on the horizontal axis), and the MFS P4 (5 and 6 on the horizontal axis). The average cooking powers for pots 1, 2, 3, 4, 5 and 6 were 1360 W, 1530 W, 1760 W, 1680 W, 1610 W and 1230 W, respectively.

Shown in FIG. 13 is a graph depicting the CO-P, PM-P, COr, and COr-P for Cookstove 1.32 (1-4 on the horizontal axis), Cookstove 1.31 (5-8 on the horizontal axis), and the MFS P4 (9-12 on the horizontal axis). CO-P, PM-P and COr-P are calculated based on emissions measured by the PEMS in the exhaust. COr is the carbon monoxide to carbon dioxide ratio as measured by the Enerac 700 at the outlet of the apparatus.

The IWA Tier for efficiency, PM, and CO was determined for Cookstove 1.31 and Cookstove 1.32, in addition to various MFS stoves. These data are listed in Table 6 below, in which Cookstove 1.32 is listed as "Cookstove 50 mm" and Cookstove 1.31 is listed as "Cookstove 25 mm".

TABLE 6

Performance data from Cookstove 1.31, Cookstove 1.32, and MFS stoves.

|  | Efficiency | IWA Tier | PM mg/MJd | IWA Tier | CO g/MJd | IWA Tier | Fire Power (W) |
|---|---|---|---|---|---|---|---|
| Cooskstove 1.32 (w/50 mm extension) | 27.3% | 2 | 22 | 4 | 1 | 4 | 5627 |
| Cookstove 1.31 (w/25 mm extension) | 29.4% | 2 | 6 | 4 | 1 | 4 | 5862 |
| MFS P4 High | 22.5% | 1 | 98 | 3 | 8 | 4 | 7174 |
| MFS P4 Low | 20.5% | 1 | 67 | 3 | 9 | 3 | 6016 |
| MFS P4 Delhi | 25.5% |  | 175 |  | 3.4 |  | 4906* |
| MFS P4 Nepal | 26.7% |  | 676 |  | 6.18 |  | 7280** |
| MFSS P4 Indonesia | 22.7% |  | 49 |  | 13.5 |  |  |

*1.25 kW cooking power at 25.48% efficiency
**Estimated 26 gram per minute burn rate with 16.8 kJ/gram As shown in Table 6, stoves from the Cookstove 1.3x series, Cookstove 1.31 and Cookstove 1.32, have higher efficiency, lower PM emissions, lower CO emissions, and comparable firepower to MFS stoves. These two cookstoves achieved the highest rating of PM and CO emissions according to the IWA rating system. Thus, the components of these stoves and their spatial relationship were able to achieve high efficiency with low PM and CO emission while allowing the user to tend fuel throughout the combustion cycle.

From these evaluations of stove performance, it was determined that additional changes to the cookstoves could include lowering the mass of the cookstove or adding the disk to the combustion chamber after the start-up phase. During the start-up phase, the airflow disk is cold, which may result in the production of more smoke due to flames failing to ignite above the airflow disk. Without wishing to be bound by any theory, staring the cookstove without the airflow disk in place, then adding it later may result in lower smoke production during the start-up phase. This could be measured, for example, as mg of particulate matter released by the stove per minute during the start-up phase with the airflow disk in place, compared to without the airflow disk. In addition, lowering the pot support may increase the efficiency by forcing more of the hot gases nearer to the cooking utensil.

Figure 14:
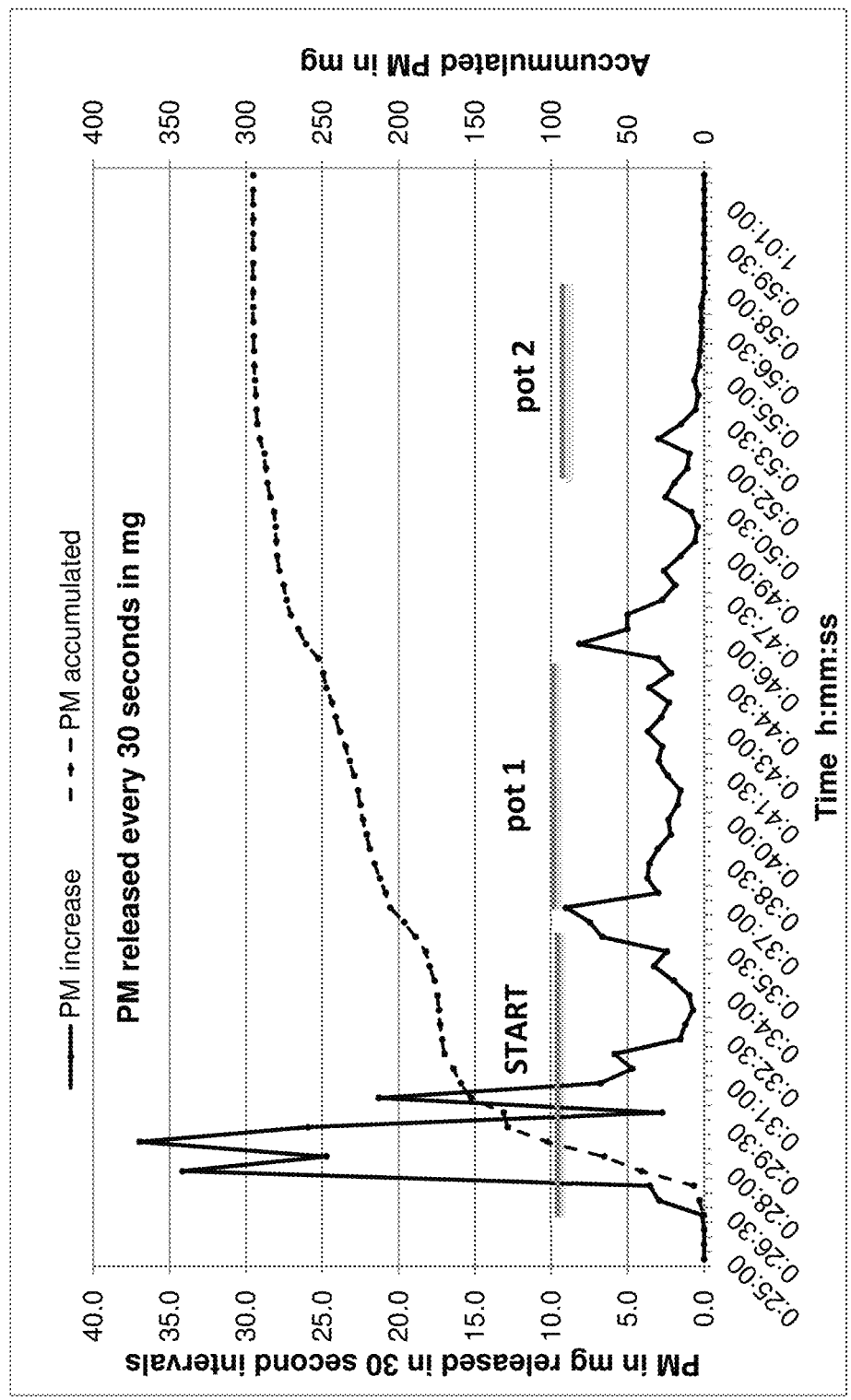
FIG. 14 is a graph showing the particulate matter (PM) released every 30 seconds and accumulated over time for two cooking pots tested with the combustion apparatus Cookstove 1.321.

The efficiency, PM emitted, CO emitted, and fire power, were also determined for Cookstove 1.321, and are shown below in Table 7. FIG. 14 is a graph showing the PM released every 30 seconds and accumulated over time for two cooking pots tested with Cookstove 1.321.

TABLE 7

Performance data for Cookstove 1.321.

|  | Efficiency | IWA Tier | PM mg/MJd | IWA Tier | CO g/MJd | IWA Tier | Fire power (W) |
|---|---|---|---|---|---|---|---|
| Pot 1 | 31.1% | 2 | 51 | 4 | 4 | 4 | 5787 |
| Pot 2 | 34.2% | 2 | 15 | 4 | 2 | 4 | 4825 |

In the test of Cookstove 1.321, the power for pot 1 was high and the stove emitted a higher level of smoke. The trial with pot 2 also emitted smoke, however the stove had a high level of power and efficiency compared to low PM per Mega Joule.

In testing Cookstove 1.32, the high power (cooking power 1900 W) trial had very low excess air and the medium power trial (cooking power at 1600 W) had slightly high excess air.

Example 8

Cookstove 1.34

This example demonstrates the effect of changing the shape of the combustion chamber and using a thicker airflow disk can have on cookstove performance.

Figure 16:
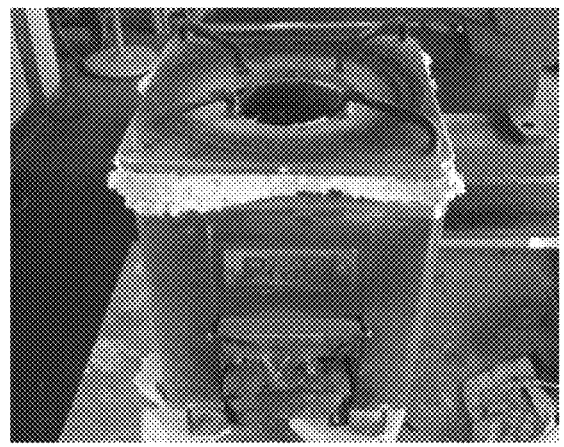
FIG. 16 is an image of combustion apparatus Cookstove 1.34.

The exemplary cookstove evaluated in this example, referred to as "Cookstove 1.34", is similar to Cookstove 1.302 described in Example 6 above, but the top portion of the combustion chamber is in the shape of a tapering cylinder placed above the terracotta sections (similar to Cookstove 1.31 and Cookstove 1.32). The tapering cylinder is 150 mm in diameter at the bottom and 110 mm at the top, with a height of 50 mm. The use of this tapering cylinder increased the combustion chamber height by 35 mm, compared with Cookstove 1.302. The airflow disk used is the same in shape as d03 in FIG. 3C, but made form a thicker sheet (1.2 mm thick) of SS310 steel, which is more durable. An image of Cookstove 1.34 is shown in FIG. 16.

It was observed in developing Cookstove 1.34 that the spiral flame effect was stronger when the combustion chamber was a right cylinder, or included a tapering cylinder near the outlet. The stronger airflow disk was able to maintain shape better during stove use, but also restricted the air flow to just above 10% of the cross sectional area of the cylinder, which is greater than the restriction of the d03 shown in FIG. 3C (which is about 20%). This resulted in a greater production of smoke and for a longer time. By starting the stove at a lower power (e.g., with less fuel) and letting the combustion build slowly, the generation of smoke could be decreased.

Figure 17:
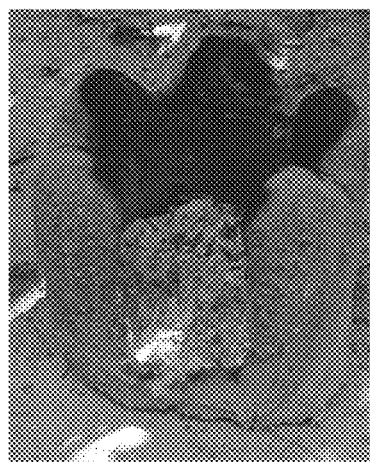
FIG. 17 is an image of a local mud stove often used in India.

The cooking power, thermal efficiency, PM-P, and CO-P for Cookstove 1.34 and a local mud cookstove were evaluated over a range of cooking powers from 0.7 kW to 1.7 kW. These data are presented in Table 8 below. FIG. 17 is an image a local mud stove.

TABLE 8

Performance data for Cookstove 1.34 and a local mud stove.

| Stove | Cooking Power (W) | Thermal Efficiency | PM-P (mg/MJd) | CO-P (g/MJd) |
|---|---|---|---|---|
| Cookstove 1.34 | 624 | 26.1% | 39.9 | 8.2 |
| Cookstove 1.34 | 844 | 27.2% | 24.0 | 2.9 |
| Cookstove 1.34 | 1467 | 29.8% | 7.3 | 1.0 |
| Cookstove 1.34 | 1361 | 32.5% | 13.3 | 1.7 |
| Local Mud | 727 | 15.1% | 109.1 | 15.4 |
| Local Mud | 1179 | 21.0% | 24.1 | 10.3 |
| Local Mud | 1665 | 19.0% | 111.0 | 13.6 |

As is seen from Table 8, the thermal efficiency at both low (624 W and 844 W) and high (1467 W and 1361 W) are higher than for the local mud stove, with decreased PM-P and CO-P, particularly at high power.

Performance of the Cookstove 1.31 and Cookstove 1.32 is compared with the Cookstove 1.34 is provided in Table 9 below.

TABLE 9

Performance data for Cookstove 1.31, Cookstove 1.32, and Cookstove 1.34.

| Cookstove Version | Thermal Efficiency | IWA Tier | PM2.5 mg/MJd | IWA Tier | CO g/MJd | IWA Tier | Cooking Power (kW) |
|---|---|---|---|---|---|---|---|
| Cookstove 1.32 | 29.8% | 2 | 22 | 4 | 1.4 | 4 | 1.5 |
| Cookstove 1.31 | 32.2% | 2 | 6 | 4 | 1.4 | 4 | 1.7 |
| Cookstove 1.34 | 26.3% | 2 | 40 | 4 | 8.2 | 3 | 0.6 |
| Cookstove 1.34 | 27.4% | 2 | 24 | 4 | 2.9 | 4 | 0.8 |
| Cookstove 1.34 | 30.0% | 2 | 7 | 4 | 1.0 | 4 | 1.5 |
| Cookstove 1.34 | 32.7% | 2 | 13 | 4 | 1.7 | 4 | 1.4 |

As shown by the data in Table 9, Cookstove 1.34 has very low emissions throughout a range of cooking powers (624 W-1724 W), representing cooking powers which are common among users of cookstoves in the community. The best performance for both emissions and efficiency of Cookstove 1.34 is at the higher levels of cooking power. The emission levels are very low compared to the IWA Tier 4 border line, and thus even with a margin of error the emission levels are likely within Tier 4 boundaries. Stoves of Cookstove 1.3x family meet forced draft (Indian standard) and Tier 4 (IWA standard) requirements for emission at a range of different cooking powers.

The grate used in the 1.3x cookstoves resulted in very little char unburned, which in turn causes the fuel efficiency to be comparable to the thermal efficiency. Fresh wood and charred wood remain close together, and all char is burned first due to the path created for primary air passing the char before it reaches the fresh wood. This keeps the fire very stable and leads to a significant reduction in fuel tending to maintain stability. This grate design also results in full burning of the available fuel.

Figure 18A:
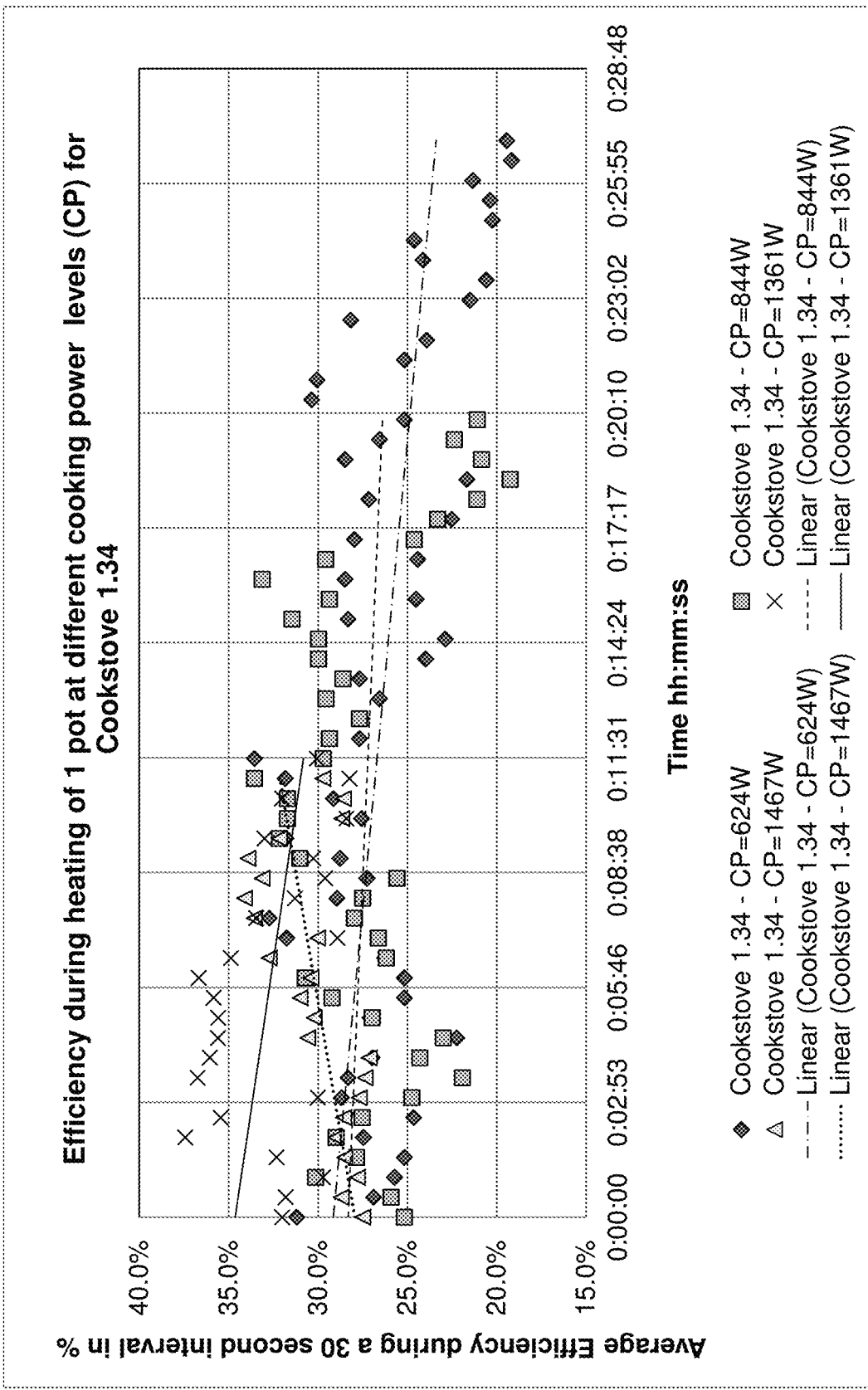
FIG. 18A depicts a graph of the efficiency in heating one pot using Cookstove 1.34 at different cooking power levels.
Figure 18B:
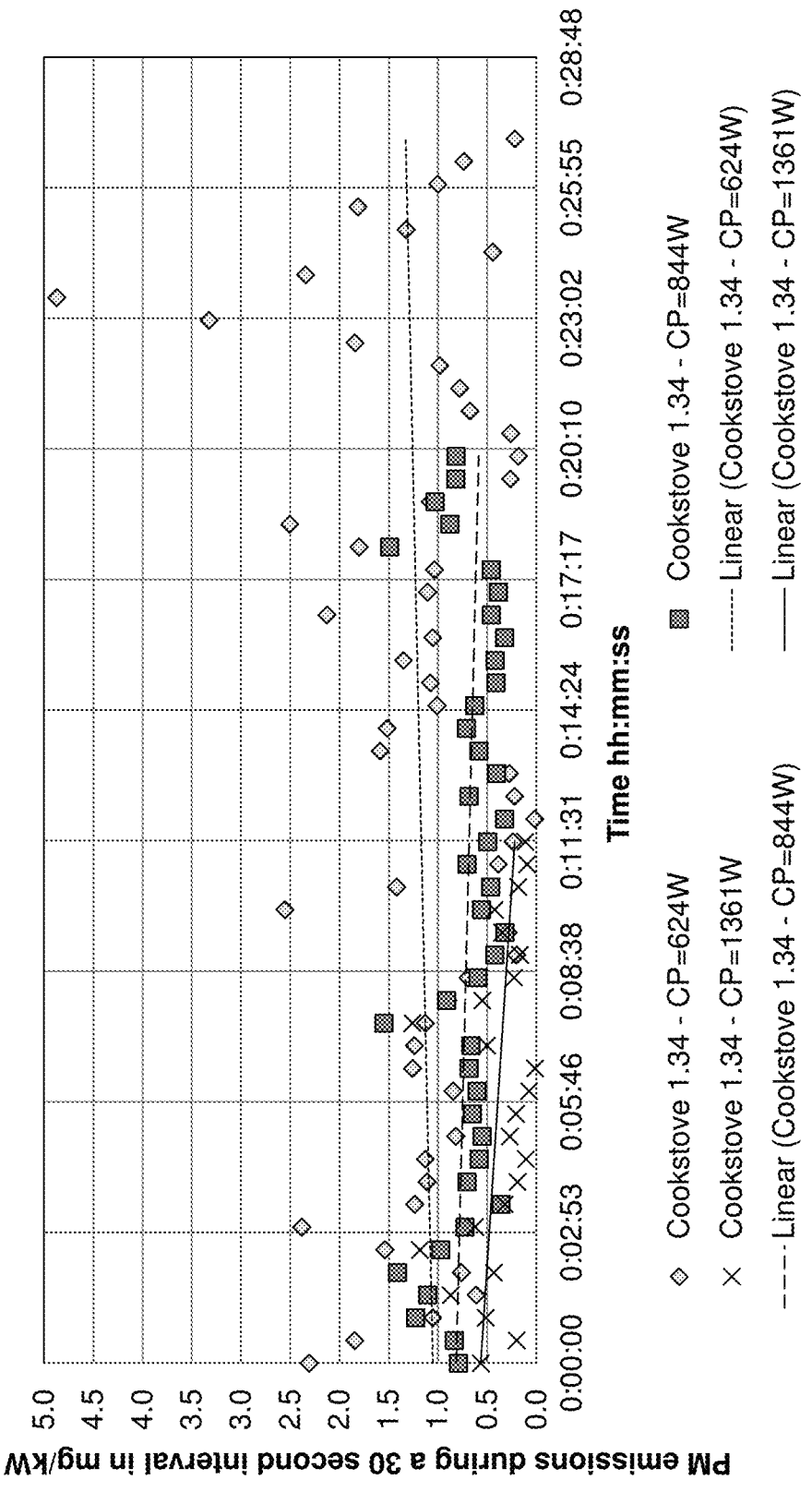
FIG. 18B depicts a graph of the ratio of particulate matter emissions to cooking power in heating one pot using Cookstove 1.34 at different power levels.
Figure 18C:
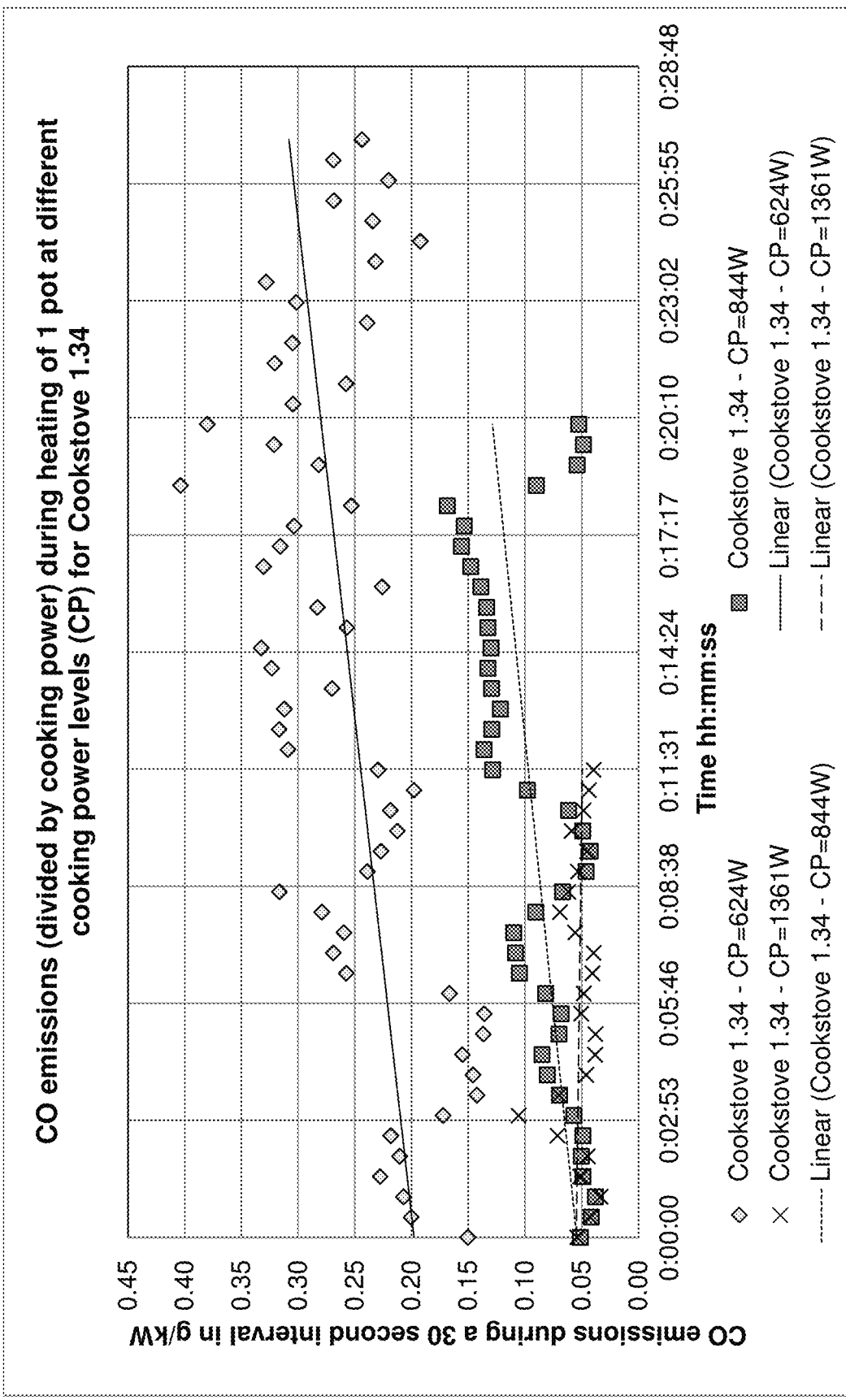
FIG. 18C depicts a graph of the ratio of CO emission to cooking power in heating one pot using Cookstove 1.34 at different power levels.

Graphs depicting the efficiency, PM emissions/cooking power, and CO emissions/cooking power for Cookstove 1.34 over different cooking power levels are shown in FIGS. 18A, 18B, and 18C. From these data, it was observed that at commonly used cooking powers in India (1200 W to 1500 W), Cookstove 1.34 has an efficiency of over 30%, with less than 50 mg/MJd PM and less than 2 g/MJd CO.

What is claimed is:

1. A combustion apparatus comprising a combustion chamber, a fuel support, and an airflow disk, wherein:
   the combustion chamber comprises:
      an inner wall defining a combustion space, and forming a floor, a side opening, and an outlet;
         wherein the outlet is positioned opposite the floor, and the side opening is located between the floor and the outlet; and
         wherein the inner wall comprises a plurality of secondary air holes located between the outlet and the side opening;
   the fuel support comprises a grate, and the fuel support is located between the top and bottom of the side opening wherein at least a portion of the fuel support is located within the combustion chamber above the floor; and
   the airflow disk is located between the side opening and the secondary air holes, comprises a plurality of blades joined at the center of the airflow disk, and is configured to allow combustion gases to flow through the disk, wherein at least a portion of each blade is rotated between 15 to 30 degrees from the plane of the center of the disk.

2. The combustion apparatus of claim 1, further comprising a housing unit, wherein the housing unit comprises a top surface, a bottom surface, and an outer wall, wherein:
   the top surface of the housing unit comprises a first opening;
      wherein the first opening is contiguous with the outlet, or wherein the combustion chamber extends through the first opening; and
   the outer wall comprises a second opening contiguous with the side opening of the combustion chamber.

3. The combustion apparatus of claim 2, wherein:
   there is at least one space between at least a portion of the outer wall and at least a portion of the combustion chamber;
   the bottom surface of the housing unit comprises at least one secondary air inlet located between the outer wall and the combustion chamber; and
   the at least one secondary air inlet is contiguous with the at least one space and at least one secondary air hole of the combustion chamber.

4. The combustion apparatus of claim 1, wherein at least a portion of the fuel support extends out of the combustion chamber through the side opening.

5. The combustion apparatus of claim 1, wherein the fuel support comprises a solid surface, and at least a portion of this solid surface is located within the combustion chamber adjacent to the side opening.

6. The combustion apparatus of claim 1, wherein the cross sectional area of air flow through the airflow disk is between 10% to 20% of the cross sectional area of the air flow through the combustion chamber.

7. The combustion apparatus of claim 1, wherein the combustion space is cylindrical.

8. The combustion apparatus of claim 1, wherein the combustion space below the airflow disk is cylindrical, the combustion space above the airflow disk is conical, and the diameter of the conical combustion space decreases approaching the outlet.

9. The combustion apparatus of claim 2, further comprising a door connected to the outer wall of the housing unit and configured to cover at least a portion of the second opening.

10. The combustion apparatus of claim 1, wherein the combustion apparatus is configured to combust biomass.

11. The combustion apparatus of claim 1, wherein the side opening is configured to continuously receive fuel.

12. A method of combusting fuel using the combustion apparatus of claim 1, comprising:
  combining combustible gases with primary air to form a first mixture in the combustion chamber, wherein the combustible gases are produced from fuel within the combustion chamber, and wherein the primary air enters the combustion chamber above and below the fuel;
  passing the first mixture vertically through the airflow disk, wherein the airflow disk directs the first mixture along a spiral path above the airflow disk; and
  combining at least a portion of the first mixture with secondary air to form a secondary mixture, wherein the secondary air enters the combustion chamber above the airflow disk.

13. The method of claim 12, wherein the secondary mixture produces heat.

14. The method of claim 12, wherein the primary air enters the combustion chamber perpendicular to the air flow through the airflow disk.

15. The method of claim 12, further comprising heating the secondary air prior to entering the combustion chamber.

16. The method of claim 12, further comprising producing flame from at least a portion of the first mixture.

17. The method of claim 16, further comprising passing the flame through the airflow disk, wherein the airflow disk directs the flame along a spiral path above the airflow disk.

18. The method of claim 12, further comprising continuously feeding the fuel into the combustion chamber.

19. The method of claim 12, further comprising igniting at least a portion of the fuel within the combustion chamber to produce the combustible gases.

* * * * *